(12) United States Patent
Crabtree et al.

(10) Patent No.: US 7,319,479 B1
(45) Date of Patent: Jan. 15, 2008

(54) SYSTEM AND METHOD FOR MULTI-CAMERA LINKING AND ANALYSIS

(75) Inventors: Ralph N. Crabtree, Atlanta, GA (US); Michael C. Moed, Hopkinton, MA (US)

(73) Assignee: Brickstream Corporation, Atlanta, GA (US)

( * ) Notice: Subject to any disclaimer, the term of this patent is extended or adjusted under 35 U.S.C. 154(b) by 378 days.

(21) Appl. No.: 09/960,218

(22) Filed: Sep. 21, 2001

Related U.S. Application Data

(60) Provisional application No. 60/234,581, filed on Sep. 22, 2000.

(51) Int. Cl.
 *H04N 5/225* (2006.01)
(52) U.S. Cl. .................................................. 348/169
(58) Field of Classification Search ................ 348/143, 348/152, 153, 154, 155, 169; 340/541; 701/207
 See application file for complete search history.

(56) References Cited

U.S. PATENT DOCUMENTS

| | | | |
|---|---|---|---|
| 4,739,401 A | 4/1988 | Sacks et al. | |
| 5,097,328 A | 3/1992 | Boyette | |
| 5,280,530 A | 1/1994 | Trew et al. | |
| 5,285,273 A | 2/1994 | James et al. | |
| 5,323,470 A | 6/1994 | Kara et al. | |
| 5,434,927 A | 7/1995 | Brady et al. | |
| 5,491,645 A * | 2/1996 | Kennedy et al. | 701/215 |
| 5,570,096 A * | 10/1996 | Knight et al. | 342/357.01 |
| 5,731,846 A | 3/1998 | Kreitman et al. | |
| 5,754,694 A | 5/1998 | Villalba | |
| 5,761,826 A | 6/1998 | Baur | |
| 5,764,283 A | 6/1998 | Pingali et al. | |
| 5,809,161 A | 9/1998 | Auty et al. | |
| 5,845,009 A | 12/1998 | Marks et al. | |
| 5,883,969 A | 3/1999 | Le Gouzouguec et al. | |
| 5,923,365 A | 7/1999 | Tamir et al. | |

(Continued)

OTHER PUBLICATIONS

Burt et al. Object Tracking with a Moving Camera. *Proceedings Workshop on Visual Motion*, Irvine, California (1989).

(Continued)

*Primary Examiner*—Mehrdad Dastouri
*Assistant Examiner*—Erick Rekstad

(57) ABSTRACT

The present invention is directed to a system and method for tracking objects, such as customers in a retail environment. The invention is divided into two distinct software subsystems, the Customer Tracking system and the Track Analysis system. The Customer Tracking System tracks individuals through multiple cameras and reports various types of information regarding the tracking function, such as location by time and real world coordinates. The Track Analysis system converts individual tracks to reportable actions. Inputs to the Customer Tracking System are a set of analog or digital cameras that are positioned to view some physical environment. The output of the Customer Tracking System is a set of customer tracks that contain time and position information that describe the path that an individual took through the environment being monitored. The Track Analysis System reads the set of customer tracks produced by the tracking system and interprets the activities of individuals based on user defined regions of interest (ROI). Examples of a region of interest are: (1) a teller station in a bank branch, (2) a check-out lane in a retail store, (3) an aisle in a retail store, and the like.

18 Claims, 16 Drawing Sheets

U.S. PATENT DOCUMENTS

| | | | |
|---|---|---|---|
| 5,947,413 | A | 9/1999 | Mahalanobis |
| 5,959,529 | A * | 9/1999 | Kail, IV ................. 340/539.12 |
| 6,049,363 | A | 4/2000 | Courtney et al. |
| 6,061,088 | A | 5/2000 | Khosravi et al. |
| 6,084,979 | A | 7/2000 | Kanade et al. |
| 6,141,433 | A | 10/2000 | Moed et al. |
| 6,185,314 | B1 | 2/2001 | Crabtree et al. |
| 6,195,121 | B1 | 2/2001 | Huang et al. |
| 6,233,008 | B1 | 5/2001 | Chun |
| 6,246,323 | B1 * | 6/2001 | Fischbach .............. 340/539.13 |
| 6,263,088 | B1 | 7/2001 | Crabtree et al. |
| 6,295,367 | B1 | 9/2001 | Crabtree et al. |
| 6,359,647 | B1 * | 3/2002 | Sengupta et al. ........... 348/154 |
| 6,396,535 | B1 * | 5/2002 | Waters ....................... 348/159 |
| 6,404,455 | B1 * | 6/2002 | Ito et al. ..................... 348/169 |
| 6,441,734 | B1 * | 8/2002 | Gutta et al. ................. 340/541 |
| 6,441,846 | B1 | 8/2002 | Carlbom et al. |
| 6,442,474 | B1 * | 8/2002 | Trajkovic et al. ........... 701/117 |
| 6,445,409 | B1 * | 9/2002 | Ito et al. ..................... 348/155 |
| 6,542,621 | B1 | 4/2003 | Brill et al. |
| 6,554,047 | B1 | 4/2003 | Mondragon et al. |
| 6,584,211 | B1 * | 6/2003 | Amemiya et al. .......... 382/103 |
| 6,628,835 | B1 | 9/2003 | Brill et al. |
| 6,654,047 | B2 * | 11/2003 | Iizaka ........................ 348/143 |
| 6,816,186 | B2 * | 11/2004 | Luke et al. ................. 348/159 |

OTHER PUBLICATIONS

Cai et al. Automatic Tracking of Human Motion in Indoor Scenes Across Multiple Synchronized Video Streams. pp. 356-362 (Abstract—Department of Electrical and Computer Engineering, The University of Texas at Austin) (1990).

Celenk et al. Moving Object Tracking Using Local Windows. *Proceedings IEEE International Symposium on Intelligent Control.* pp. 180-185 (1988).

Liao et al. Tracking Human Movements Using Finite Element Methods. pp. 1-11 (Paper—Dept. of Electrical and Computer Engineering, The University of Texas at Austin) (1994).

Montera et al. Object Tracking Through Adaptive Correlation. *Optical Engineering* 33(1):294-302 (1994).

Salari et al. Feature Point Correspondence in the Presence of Occlusion. *Pattern Analysis and Machine Intelligence* 12(1):87-91 (1990).

Sethi et al. Finding Trajectories of Feature Points in a Monocular Image Sequence. *Pattern Analysis and Machine Intelligence* PAMI-9(1):56-73 (1987).

Tsai et al. Uniqueness and Estimation of Three-Dimensional Motion Parameters of Rigid Objects with Curved Surfaces. *IEEE.* pp. 112-118 (1982).

Tsai et al. Estimating Three-Dimensional Motion Parameters of a Rigid Planar Patch. *IEEE.* pp. 94-97 (1981).

Lai et al., "Deformable Contours: Modeling and Extraction", Electrical and Computer Engineering, University of Wisconsin, 1994.

Lane et al., "Robust Tracking of Multiple Objects in Sector-Scan Sonar Image Sequences Using Optical Flow Motion", *IEEE Journal of Oceanic Engineering*, vol. 23, No. 1, Jan. 1998.

Co-pending U.S. Appl. No. 09/960,617, filed Sep. 21, 2001.

Co-pending U.S. Appl. No. 10/724,394, filed Dec. 1, 2003.

* cited by examiner

SYSTEM AND METHOD FOR MULTI-CAMERA LINKING AND ANALYSIS

This patent application claims the benefit of U.S. Provisional Patent Application No. 60/234,581, filed Sep. 22, 2000, entitled "System and Method for Multi-Camera Linking and Analysis", which is incorporated herein in its entirety, by reference thereto.

BACKGROUND OF THE INVENTION

1. Field of the Invention

The present invention relates generally to a system and method for tracking objects, such as people, using one or more video cameras. In one embodiment, the present invention may be used to track people through a retail environment.

2. Description of the Prior Art

Basic video tracking systems are well known in the art. The video tracking systems previously known lack certain functional capabilities required for generating accurate and comprehensive tracking information, especially while using multiple video cameras.

Primarily to date, research and development has been focused on single camera tracking solutions. For example, see Celenk et al. in a 1988 IEEE article entitled "Moving Object Tracking Using Local Windows"; Tsai et al. in IEEE articles, published in 1981, entitled "Estimating Three-Dimensional Motion Parameters Of A Rigid Planar Patch, and Uniqueness" and "Estimation Of Three-Dimensional Motion Parameters Of Rigid Objects With Curved Surfaces"; Liao in a 1994 article entitled "Tracking Human Movements Using Finite Element Methods"; Montera et al. in a 1993 SPIE article entitled "Object Tracking Through Adaptive Correlation"; Burt et. al. in a 1989 article entitled "Object Tracking With A Moving Camera"; Sethi et al. in a 1987 article entitled "Finding Trajectories Of Feature Points In A Monocular Image Sequence"; and Salari et al. in a 1990 article entitled "Feature Point Correspondence In The Presence Of Occlusion."

Q. Cai et al. in an article entitled "Automatic Tracking of Human Motion in Indoor Scenes Across Multiple Synchronized Video Streams" describes a method for object tracking through multiple cameras. This solution is limited by the fact that all Single View Tracking systems must be accurately time synchronized in order to support accurate camera hand-off. Also, intensity features are used for camera-to-camera hand-off, even though in most applications intensity features will vary from camera to camera based on camera viewing perspective—one camera views the front of the object being tracked while the other views the back of the object being tracked. This methodology may work well in simple environments with a limited number of cameras, but will likely not work well in complex environments and/or environments with a large number of cameras.

Robert B. Boyette, in U.S. Pat. No. 5,097,328, describes a system that collects and reports information on the number of people in a queue, service time, and anticipated wait time in a queue for a bank branch. This system is limited by the fact that the average time in a queue is computed based on arrival rates and service times, not actual queue wait times, and as such is inaccurate. Also, since there is no record of individual customer activities, it is not possible generate reports with respect to a person's sequence of activities, which can be used in identifying customer behavior.

There is a therefore need for a sophisticated, yet cost effective, tracking system that can be used in many applications. For example, it has become desirable to acquire information concerning the activity of people, for example, within a scene of a retail establishment, a bank, automatic teller machines, bank teller windows, to name a few, using data gathered from analysis of video information acquired from the scene.

It is also desirable to monitor the behavior of consumers in various locations of a retail establishment in order to provide information concerning the sequence of events and decisions that a consumer makes. This information is useful in many situations, such as, to adjust the location and features of services provided in a bank, to change merchandising strategies and display arrangements; etc. Consequently, it is necessary for the system to differentiate between people in the scene and between people and other stationary and moving objects in the scene.

Given the size of these environments, a video tracking system is needed which can track the movement of objects, such as people, through multiple cameras. Moreover, this tracking system must support the capability to query track information in order to generate information that describes how people and the environment interact with one another.

SUMMARY OF THE INVENTION

The present invention is directed to a system and method for tracking objects, such as customers in a retail environment. The invention is divided into two distinct software subsystems, the Customer Tracking system and the Track Analysis system. The Customer Tracking system tracks individuals through multiple cameras and reports various types of information regarding the tracking function, such as location by time and real world coordinates. The Track Analysis system queries individual track data and generates reports about customer activity and behavior. Inputs to the Customer Tracking system are a set of analog or digital cameras that are positioned to view some physical environment. The output of the Customer Tracking system is a set of customer tracks that contain time and position information that describe the path that an individual took through the environment being monitored. The Track Analysis system reads the set of customer tracks produced by the tracking system and interprets the activities of individuals based on user defined regions of interest (ROI). Examples of a region of interest are: (1) a teller station in a bank branch, (2) a check-out lane in a retail store, (3) an aisle in a retail store, and the like.

DETAILED DESCRIPTION OF THE INVENTION

1. Overall Architecture

Figure 1:
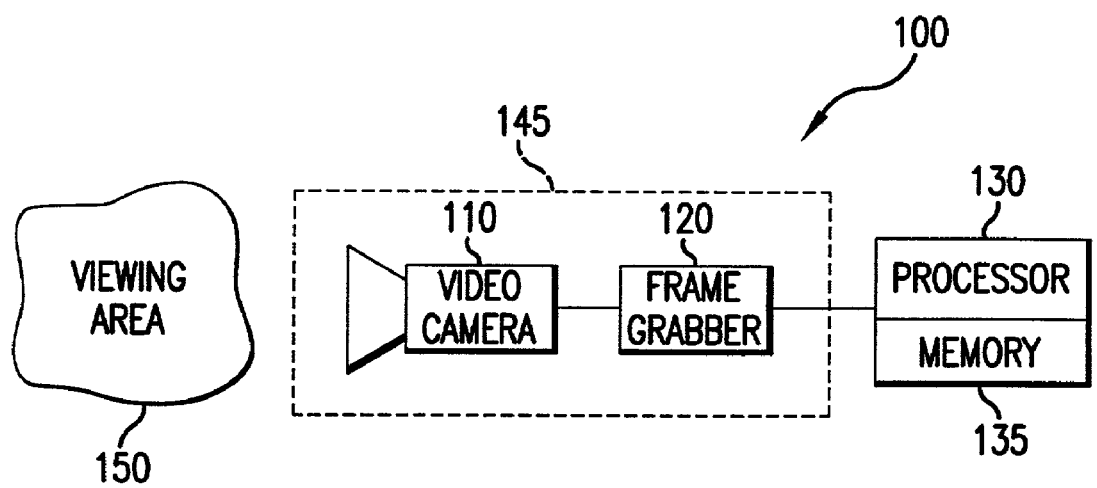
FIG. 1 is a block diagram showing the overall architecture of the present invention, in one embodiment.

FIG. 1 illustrates the hardware components of the present invention, in one embodiment. The hardware components may be standard off-the-shelf components, and include one or more video cameras 110, one or more frame grabbers 120, and a processor 130, such as a personal computer (PC) or equivalent, having a memory 135 which stores software programs for controlling the processor 130. The combination of the video camera 110 and frame grabber 120 may collectively be referred to as an "image acquisition module" 145. The frame grabber 120 may receive a standard video signal output by the video camera 110, such as a RS-170, NTSC, CCIR, or PAL video signal, which can be monochrome or color. In a preferred embodiment, the video cameras 110 are mounted or positioned to view a selected viewing area or scene 150 of interest (region of interest—ROI), such as a checkout lane in a retail establishment, an automated teller machine (ATM), an entrance, an exit, or any other localized area where people or objects may move and/or interact with devices or other people or objects.

The frame grabber 120 is embodied, for example, by a Meteor™ Color Frame Grabber, available from Matrox. The frame grabber 120 operates to convert the analog video signal into a sequence or stream of digital video frame images that are stored within the memory 135, and processed by the processor 130. For example, in one implementation, the frame grabber 120 converts the video signal into a 2×2 sub-sampled NTSC image which is 320×240 pixels or a 2×2 sub-sampled PAL color image which is 384×288 pixels, or in general a W×L image defining a single video frame of video information. A variety of other digital image formats and resolutions are also suitable, as will be recognized by one of ordinary skill in the art. Each pixel of a video frame has a predetermined bit resolution, such as 8 bits, and color data may be used to increase system performance. The digital information representing each video frame is stored in the memory 135 asynchronously and in parallel with the various processing functions described below.

2. Customer Tracking

Figure 2:
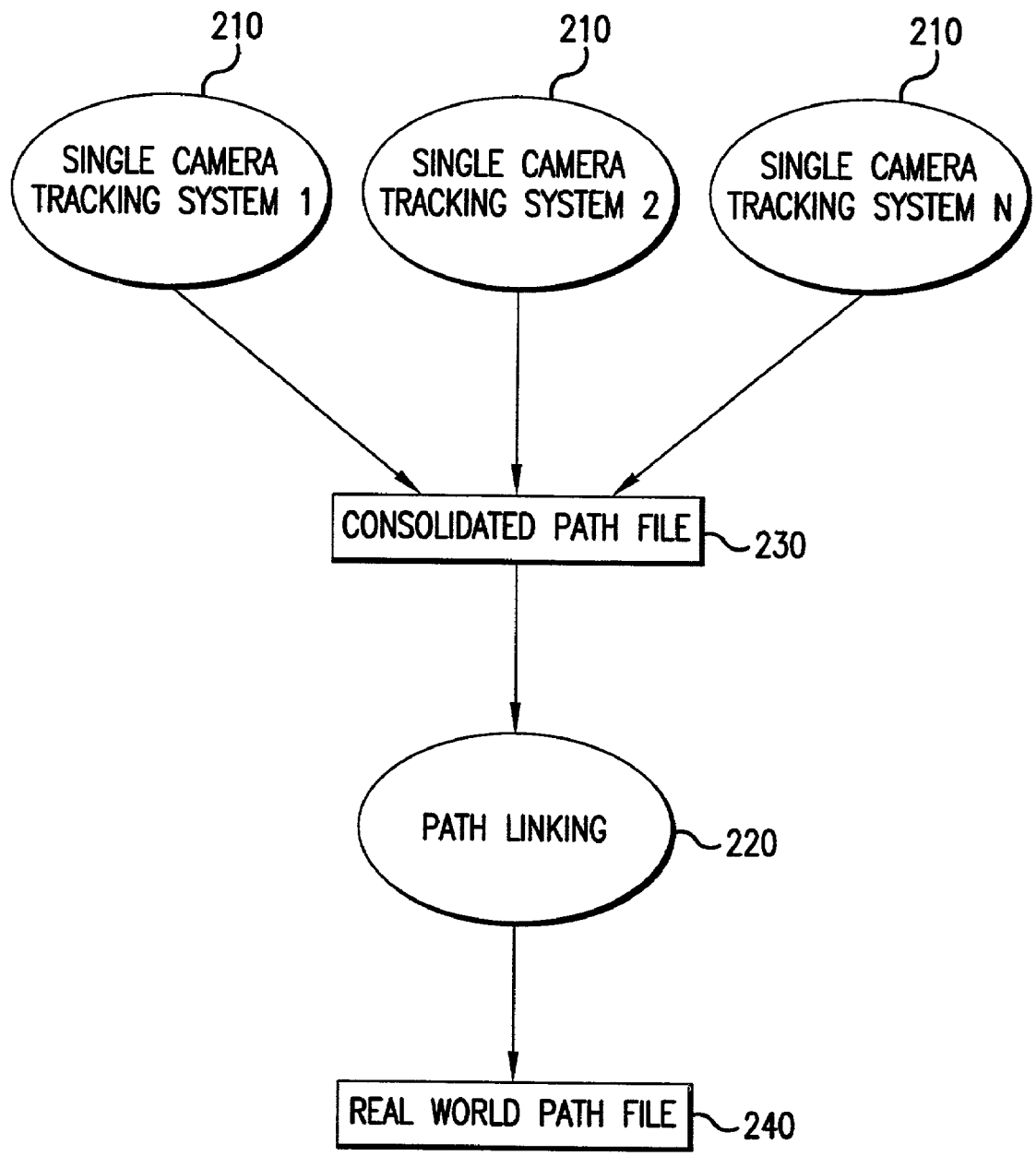
FIG. 2 is a flow diagram showing the overall flow of the present invention.

The entire video camera and processing system of FIG. 1 may be referred to herein as a Single Camera Tracking system 210. As shown in FIG. 2, a Customer Tracking system may be divided into two distinct subsystems: Single Camera Tracking systems 210 and Path Linking system 220. The Single Camera Tracking system 210 generates path information for individuals as they move through a single camera 110 view in real-time.

The path information for a single path may consist of an ordered set of data elements. Each data element is composed of an x,y coordinate in image space, a camera 110 identifier, and a timestamp. The individual path is written to a consolidated path file 230 when the individual exits the camera 110 view or the path is broken.

The Path Linking System 220 reads paths from the consolidated path file 230 generated by all Single Camera Tracking systems 210 over some period of time. The Path Linking system 220 may perform the following operations.

Repairs broken tracks for an individual in a single camera 110 view.

Links individual customer tracks across multiple cameras 110.

Converts paths from an individual camera 110 coordinate system to a global real world coordinate system.

The output of the Path Linking System 220 is a real-world path file 240 containing path information describing an individual's path through a real world environment. The path information for a single path may consist of an ordered set of data elements, each of which is composed of an x,y coordinate in real world space and a timestamp.

In order to perform path linking 220, the following elements, explained in further detail below, are required as input:

A database containing the following data (all explained in further detail later):

Camera calibration information, defined later in Multi-Camera Calibration and Transformation to Real World Coordinates.

Multi-camera calibration information, including the set of corresponding points across multiple camera views, defined later in Multi-Camera Calibration and Transformation to Real World Coordinates.

A set of Region of Interest (ROI) filters for each camera 110.

A consolidated event/path file 230 containing the tracks (i.e. paths) generated from one or more Single Camera Tracking systems.

As output, the Path Linking System 220 provides a file 240 containing the set of linked paths translated into real world coordinates.

Region of interest (ROI) filters are required to address certain situations that create erroneous paths during the path linking process. Three types of ROI filters may be used:

Exclusion Regions. Exclusion regions are rectangular areas where path linking is not allowed to occur. An example of an exclusion region is a camera boundary where there is no other overlapping camera. If a path of an individual exiting the camera 110 view coincides with the creation of a path of an individual entering a camera 110 view, the path linking system may attempt to link the two paths. This results in an erroneous link. By defining an exclusion region on the edge of a camera 110, path linking will not be allowed to occur in this area.

Break Regions. Break regions are similar to exclusion regions in that they address locations in the camera view 110 where erroneous linking may occur. Break regions identify areas where it may be possible that a Single Camera Tracking system 210 may have created an erroneous link. Like exclusion regions, break regions are placed on camera 110 boundaries.

Warping Region. A warping region defines an effective tracking area for a camera 110 view. This is defined in further detail below.

To allow a camera 110 to obtain as large a field of view as possible, wide-angle lenses are often used. Unfortunately, wide-angle lenses create significant warping near the corners of images. Paths that occur in these parts of an image are often noisy and inconsistent. A method has been developed, called the Warping Region of Interest (ROI) filter, which removes path segments that occur in these warped regions.

The Warping ROI filter is an elliptical mask that removes all parts of paths that lie outside the elliptical boundary. For each camera 110 view, a Warping ROI filter can be defined by specifying the center point, major axis size, and minor axis size for the filter. In some instances, a filter may not be specified. The values for center, major, and minor axis are given in pixels.

Figure 3:
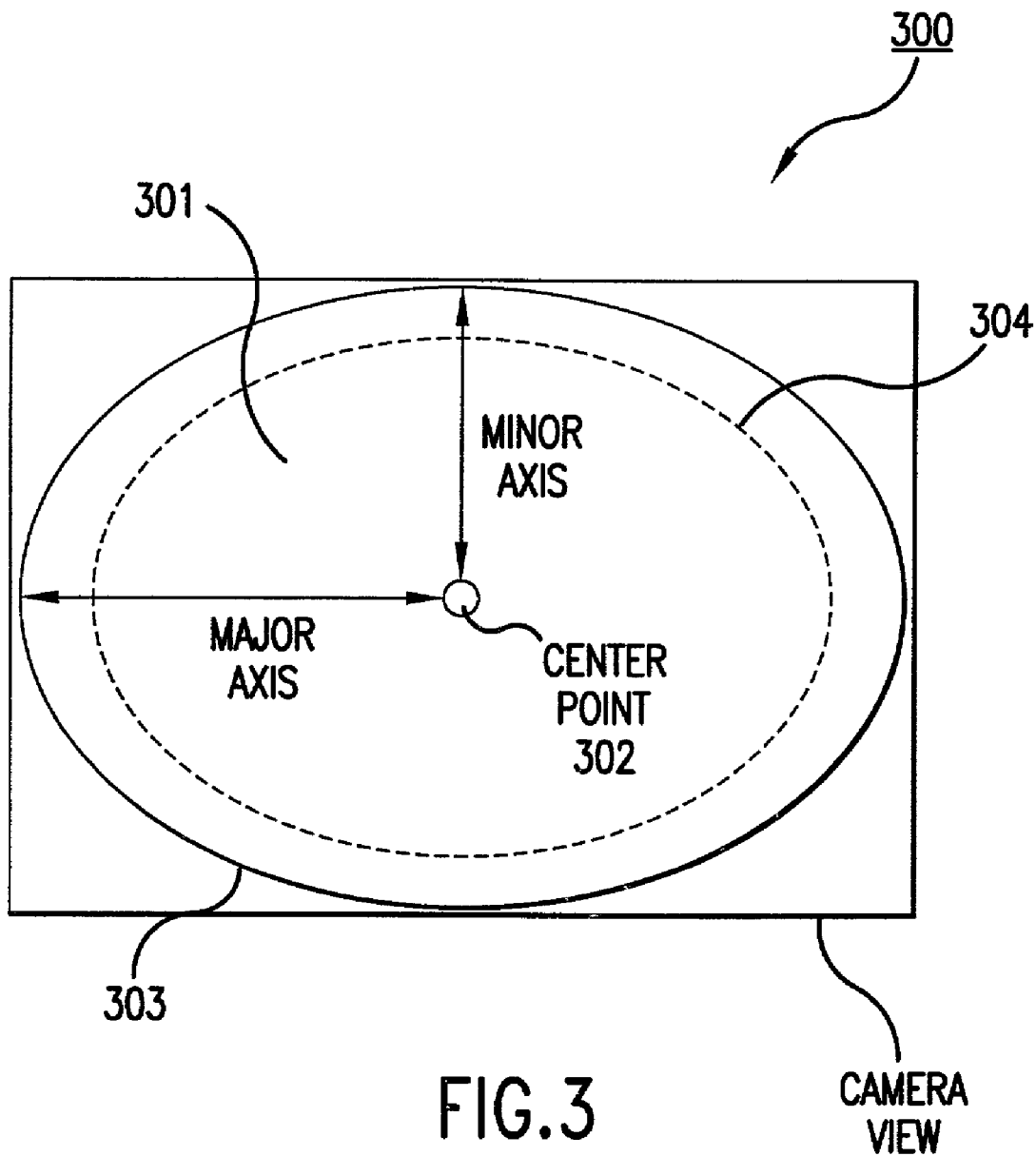
FIG. 3 depicts a region of interest (ROI) filter used in the present invention.

A diagram illustrating an ROI filter 300 is provided in FIG. 3. The area 301 (e.g. an ellipse) bounded by the boundary 303 indicates the region in which path information is retained. All paths or segments of paths that lie outside the area 301 bounded by the boundary 303 are removed when the paths are first read from the consolidated event file 230.

If the end of a path is very close to the edge of the ROI filter 300, it may not be advisable to link the end of this path to a path beginning close to that same location in the same scene. For example, confusion may occur between one person exiting the camera 110 view and another person entering the same camera 110 view nearby. To avoid this confusion, the ROI filter 300 contains one additional parameter, called "fringe percentage", which ranges from 0 to 1.0. This value makes it possible to tailor the range of distances from the center of the ellipse within which the system will allow same scene linking to occur. A value of 1.0 means that same scene linking can occur anywhere in the ROI. A value of 0.75 indicates that same scene linking can only occur within 75% of the distance of the ROI center 302 to the edge. The boundary 303 represents a value of 1.0, which allows same scene linking anywhere in the ellipse. The boundary 304 represents a value of 0.75, which allows same scene linking only within this area 304 of the ellipse.

The output file produced by the system is the linked path output file 240. This file contains no header information. Each path in the file may be stored in the following format (as defined in PathLink.h).

The Path ID (int)
The number of points on the path (int)
A character buffer of path points, where each path point is of type PL_InstantStruct, defined by:

```
struct PL_InstantStruct{
    PL_IntPoint m_position;    // the real world position
    CTime m_time;              // the time instant of the point
    int m_pathID;              // a reference to the path ID
};
``` where PL_IntPoint is defined by:

```
struct PL_IntPoint{
    int x,
    int y,
};
```

Figure 4:
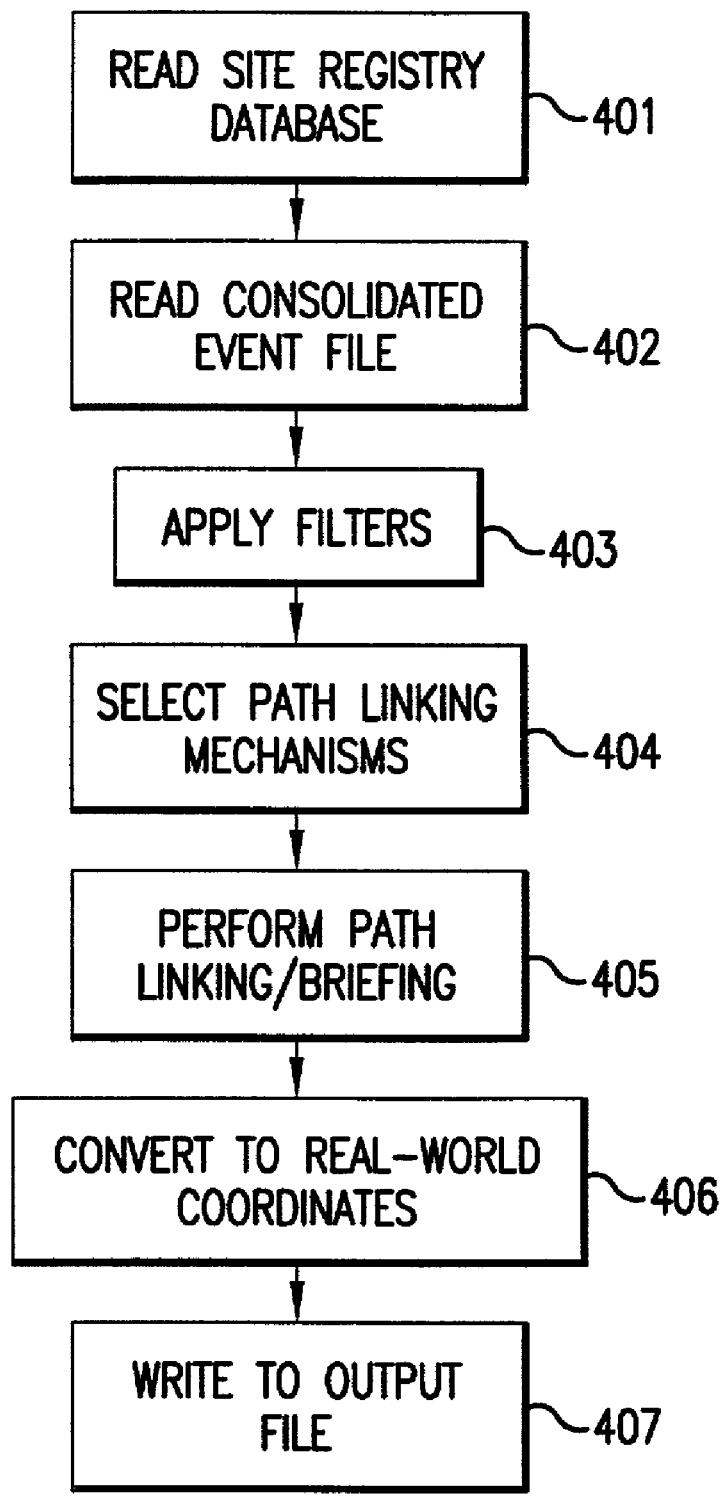
FIGS. 4-5 are flow diagrams depicting processes used for path linking in the present invention.

Referring to FIG. 4, the Path Linking System 220 executes the following steps to perform path linking. Each step is explained in further detail later:
 [401] The parameter database is read.
 [402] The consolidated event file is read.
 [403] ROI filters, Warping, Exclusion, and Break filters, are applied.
 [404] Path linking mechanisms are selected.
 [405] Path linking and path breaking are performed for a predefined set of iterations.
 [406] Paths are converted to real world coordinates.
 [407] Real world path information is written to the output file.

In step 401, the parameter database is read to obtain the following information required by path linking and analysis:
 The number of camera 110 views.
 The camera 110 views.
 The calibration parameters for each camera 110 views.
 The multi-camera calibration information, including cross-camera calibration points for the set of camera 110 views.
 The ROI filters 300 parameters for each camera 110 views (if they exist).

In step 402, the consolidated event file 230 is read to obtain the track information generated by some number of Single Camera Tracking systems 210. Each track is read and stored as a PL_Path object. Each PL_Path object maintains the following information:
 The Path ID (int).
 A set of path elements, where each element is a PL_Instant, described below.
 The Scene ID, or the single camera 110 view identifier, for the first point on the path (int).
 A flag indicating if the end of this path can be linked to a path in the same scene, called the CanLinkToSameScene (bool) flag. This is determined by the ROI Fringe Percentage parameter or the Exclusion ROI filter.
 A PL_Path pointer to a next path. This is the path to which the end of the current path is linked. This pointer is assigned during the path linking process 220.
 A PL_Path pointer to a previous path. This is the path to which the beginning of the current path is linked. This pointer is assigned during the path linking process 220.
 The linking technique used to link to the next path (int). This value is assigned during the path linking process 220.
 The linking confidence for the link to the next path (double). This value is assigned during the path linking process 220.
 An indicator if this path is a duplicate path (bool). This value is assigned after path linking 220 using a separate routine that checks for duplicate paths.

A PL_Instant represents a particular point on the path. Each PL_Instant object contains the following information:
 The Scene ID (int).
 The feet position in image coordinates (PL_IntPoint, described previously).
 The centroid position in image coordinates (PL_IntPoint).
 The time at which the point occurs (CTime).

Figure 5:
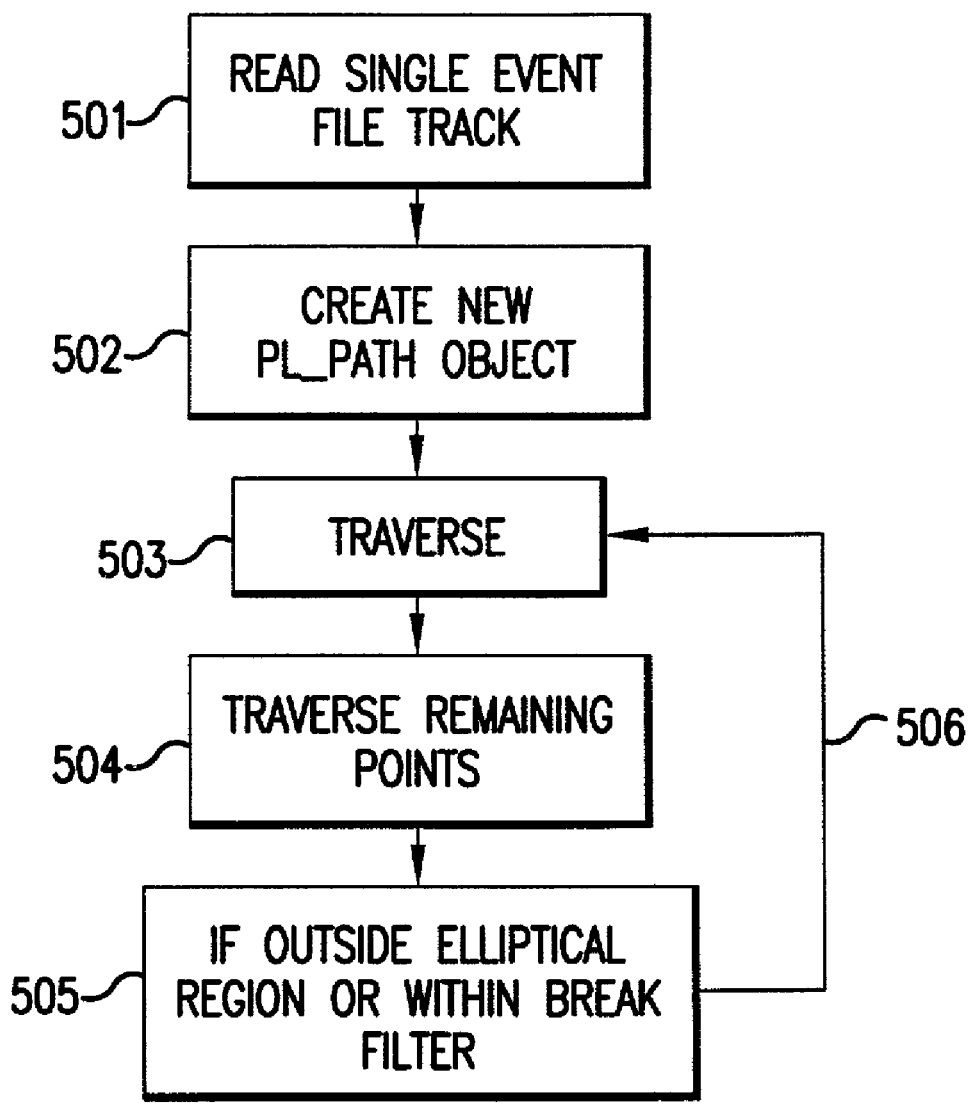

In step 403, as each path is read from the consolidated event file 230, filtering is applied. Paths are filtered using the ROI elliptical filter and/or by applying Break filters. With reference to FIG. 5, the process works as follows.
 [501] A single event file path is read in to temporary storage (such as memory 135).
 [502] A new PL_Path object is created.
 [503] The event file track is traversed point by point. All points at the beginning of the event file track that are outside the elliptical region 300 or are within a break filter are discarded.
 [504] The remaining points are traversed one by one. As long as a point is inside the elliptical region 300 and not within a break filter, it is added to the PL_Path object.
 [505] If a point is found that is outside the elliptical region 300 or within a break filter, the current PL_Path object is completed and stored. A new PL_Path object is then created.
 [506] The process loops to step 503, with the remaining event file path and the new PL_Path object.

By using the above process, a path that moves outside the elliptical region 300 and then moves back within the region will be split into two PL_Path objects. Similarly, as a path moves into a Break Filter region and out of a break filter region, two PL_Path objects are created. All paths that lie entirely outside the elliptical region or completely within one or more Break Regions are removed.

After each of the PL_Path objects (or paths) are created, the last point of each path is tested against the Fringe Percentage (fp) value using the following formula:

$$\frac{(x-cx)^2}{a^2} + \frac{(y-cy)}{b^2} \leq fp$$

If this expression evaluates to TRUE, same scene linking is allowed for this path, and the CanLinkToSameScene flag is asserted in the PL_Path object. Otherwise, this flag is set false. Note that a is the major axis of the ellipse, and b is the minor axis value (in pixels).

A similar test is performed for exclusion regions. If the last point of the path lies within an exclusion region, scene linking is allowed for this path, and the CanLinkToSameScene flag is asserted in the PL_Path object.

In step 404, several mechanisms are present in the present invention. Each mechanism provides a unique methodology for determining whether two paths can be linked together. Some of the mechanisms work only on paths within a single scene, while other path linking mechanisms are used for paths that cross between multiple scenes. All of the mechanisms are parameterized to allow a configuration to determine the range of conditions under which they are applicable.

Each path linking returns the following structure:

```
struct PL_LinkResult
{
    unsigned int m_resultFlags;
    double m_value;
    double m_confidence;
};
```

The m_resultFlags variable contains information about whether the paths could be successfully linked, or if not, the reason for failure. The m_value variable contains additional information about the failure mode, such as the actual real-word distance or time distance recorded between the two paths being tested for linking. If linking is possible for the two paths, the variable m_confidence contains a value between 0.0 and 1.0 that indicates the confidence that these two paths can been linked together given this path linking method and its associated parameters. Descriptions of the available path linking mechanisms are presented below.

Scene path linking mechanisms are employed only when two paths both occur in the same scene, or camera 110 view. Two such mechanisms are available:

IterTimeDistance_Scene
IterOverlap_Scene

The Iter prefix indicates that each of these methods can be repetitively applied to already linked paths to build longer linked paths. The _Scene suffix indicates that these methods apply only to paths in the same Scene.

This first Scene linking mechanism is IterTimeDistance_Scene. This method fixes simple path breaks in which a person is being tracked, the track disappears for a few seconds, and then the path reappears.

Provided with two paths, this method determines if the endpoint of the first path is sufficiently close in time and distance (hereby called the time-space bubble) to the start point of the second path. Time is measured in seconds and distance is measured in inches. The conversion from an image coordinate space to a real world coordinate space is described in Multi-Camera Calibration and Transformation to Real World Coordinates. If it is sufficiently close, the paths can be linked.

The following parameters are provided to this mechanism:

The maximum time difference in seconds.
The maximum spatial distance in inches
A boolean flag indicating whether distance should be measured using the foot position of the two points, or the centroid position (TRUE=centroid, FALSE=foot).
The maximum confidence value that can be returned by this method for the smallest possible time-distance difference.
The minimum confidence value that can be returned by this method for the largest possible time-distance difference (within the maximum time-space bubble).

Figure 6:
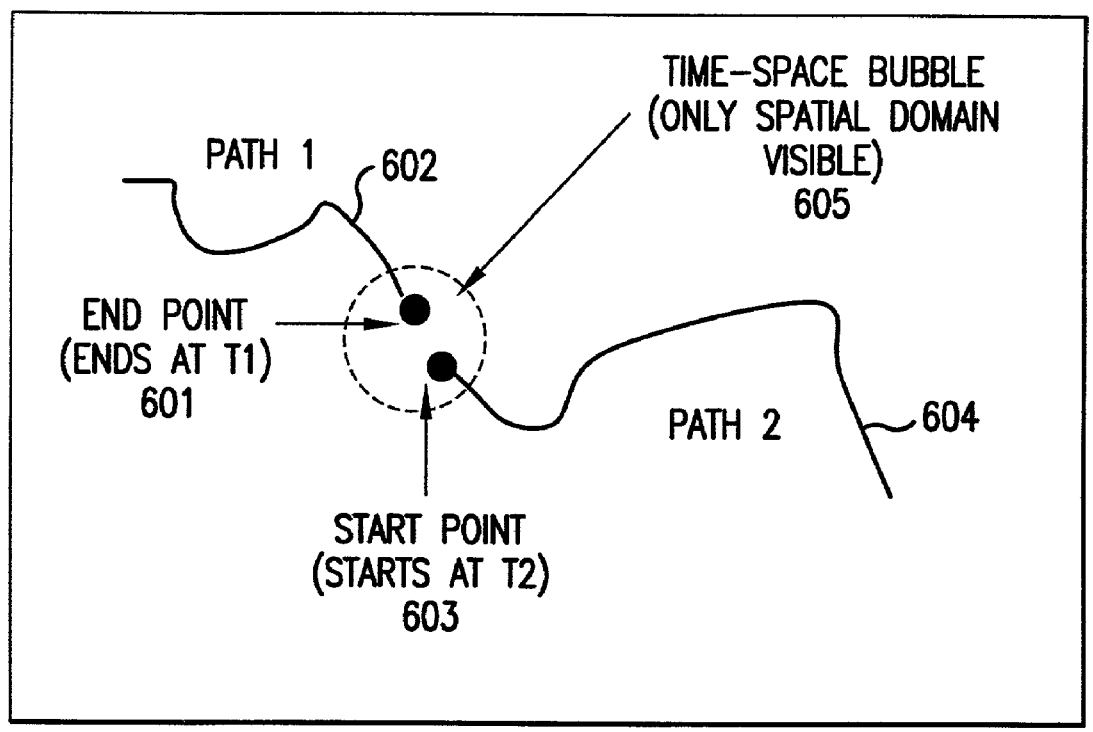
FIGS. 6-8 are diagrams depicting how the linking process may be performed in one embodiment.

Referring to FIG. 6, the end point 601 of Path1 (602) and the start point 603 of Path 2 (604) fall within an acceptable distance, as denoted by the time-space bubble 605 in this figure. If (T2-T1)<Max Time, then the two paths can be linked.

The returned confidence value is generated using the following formula:

$$RC = \text{Min Conf} + ((\text{Max } SD - \text{Actual } SD)/\text{Max } SD) * (\text{Max Conf} - \text{Min Conf})$$

Where:
RC is the returned confidence value.
Min Conf is the minimum confidence parameter provided to the function as input.
Max SD is the maximum spatial distance parameter provided to the function as input.
Actual SD is the actual computed spatial distance (in inches) between the end point of the first path, and the start point of the second path.
Max Conf is the maximum confidence parameter provided to the function as input.

Figure 7:
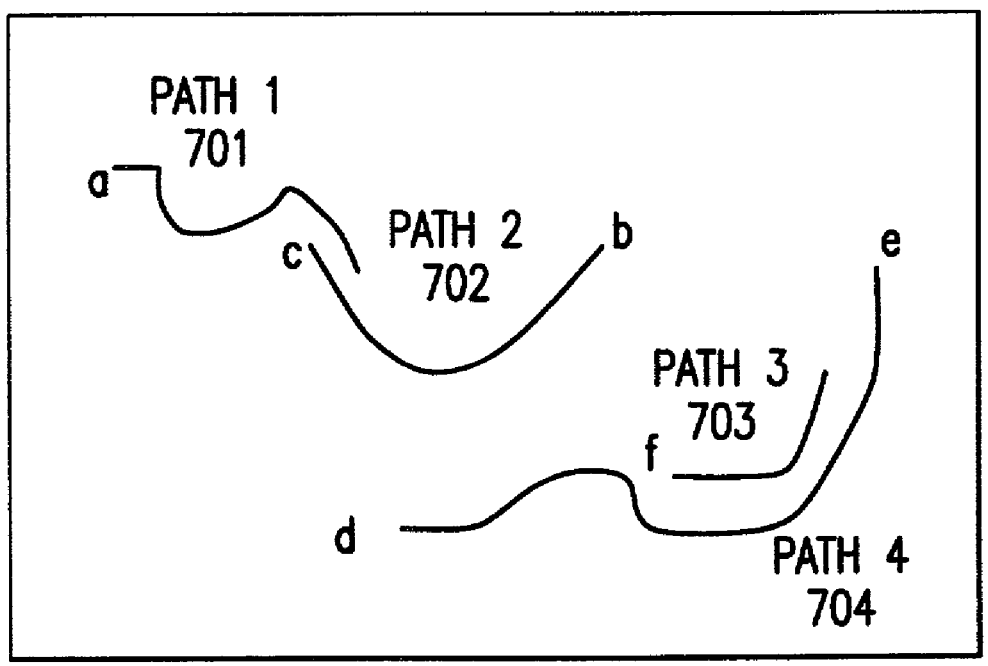

The second scene linking mechanism is IterOverlap_Scene. This method fixes more complex path breaks that occur when an individual being tracked separates into two coexisting tracks. It is desirable for the two tracks to be merged into a single track, since there is really only one person. A diagram showing each of two possible cases that can occur is shown in FIG. 7:

In FIG. 7, Path 1 (701) and Path 2 (702) demonstrate one possible case. An individual being tracked from point a to point b breaks up into two paths at point c, generating Path 1 (701) and Path 2 (702). Path 1 (702) and Path 2 (702) overlap in time, so IterTimeDistance_Scene cannot link the paths, yet somehow these two paths must be linked together to get the full path for the individual. IterOverlap_Scene provides this linking capability.

Paths 3 (703) and 4 (704) represent another case. An individual being tracked from point d to point e breaks up into two paths at point f, generating Paths 3 (703) and 4 (704). However in this case, Path 3 (703) disappears after a short time, and Path 4 (704) remains. We do not need to link these two paths together, but would prefer to label Path 3 (703) as a duplicate path, and only retain Path 4 (704). IterOverlap_Scene will not link these paths, allowing another mechanism (described later) to label Path 3 (703) as a duplicate, and remove it from consideration.

For two paths that overlap in time, IterOverlap_Scene compares the real-world distance in inches between the two paths for each shared time instant. If at any point during the shared time of existence the distance between the paths is greater than a maximum value, the paths cannot be linked.

The following parameters are provided to this mechanism:

The maximum spatial distance in inches.

A boolean flag indicating whether distance should be measured using the foot position of the two points, or the centroid position (TRUE=centroid, FALSE=foot).

The maximum confidence value that can be returned by this method for the smallest possible distance difference.

The minimum confidence value that can be returned by this method for the largest possible distance difference.

If the two paths can be linked, the returned confidence value is generated using the following formula:

$$RC=\text{Min Conf}+((\text{Max }SD-\text{Worst }SD)/\text{Max }SD)*(\text{Max Conf}-\text{Min Conf})$$

Where:

RC is the returned confidence value.

Min Conf is the minimum confidence parameter provided to the function as input.

Max SD is the maximum spatial distance parameter provided to the function as input.

Worst SD is the worst actual computed spatial distance (in inches) between any pair of points (one from each path) that share the same time instant.

Max Conf is the maximum confidence parameter provided to the function as input.

Site path linking mechanisms are employed only when two paths both occur in the different scenes. Three such mechanisms are available:

IterTimeDistance_Site

IterOverlap_Site

IterOverTimeShift_Site

The Iter prefix indicates that each of these methods can be repetitively applied to already linked paths to build longer linked paths. The _Site suffix indicates that these methods apply to paths that cross multiple Scenes.

The first site linking mechanism is TimeDistance_Site. This method fixes simple path breaks in which a person is being tracked, the track disappears for a few seconds, and then the path reappears across scene boundaries. It is analogous (input, output, and methodology) to IterTimeDistance_Scene, except that it works for paths that cross between multiple Scenes.

The second site linking mechanism is IterOverlap_Site. This method fixes more complex path breaks that occur when an individual being tracked separates into two coexisting paths and these paths cross scene boundaries. It is desirable for the two paths to be merged into a single path, since there is really only one person. It is analogous (input, output, and methodology) to IterOverlap_Scene, except that it works for paths that cross between multiple Scenes.

The third site linking mechanism is IterOverTimeShift_Site. This method fixes more complex path breaks that occur when an individual being tracked separates into two coexisting paths and these paths cross scene boundaries. It is desirable for the two paths to be merged into a single path, since there is really only one person.

IterOverTimeShift_Site also handles slight timing variations that may occur between scenes residing on two different PCs 130. Since each PC 130 has its own clock, it is necessary to synchronize the clocks across the site so that paths in the consolidated event file have consistent time stamps. Since it still may be possible for different PCs 130 to have a slight clock skew (2 secs or less), this is included to correct this problem.

The methodology used for IterOverTimeShift_Site is very similar to IterOverlap_Site with one exception. The user provides a time shift value to the function. The function then (in essence) shifts all the points on one of the paths in time by the time shift value before performing the IterOverlap_Site.

If at any point during the shifted-shared time of existence the distance between the paths is greater than a maximum distance value, the paths cannot be linked. However, another condition is also placed on the paths before success is determined. The average distance between the two paths during the shifted-shared time of existence is also determined. If this value is greater than half of the maximum distance value, the paths cannot be linked. The combination of these two conditions allows the user to specify a looser maximum distance (because the difference between PC times is not precise, and therefore the distance may be way off for one or two points), since the average distance test will help insure that the paths are close together overall.

The following parameters are provided to this mechanism:

The time shift value in seconds (usually 1 or −1).

The maximum spatial distance in inches.

A boolean flag indicating whether distance should be measured using the foot position of the two points, or the centroid position (TRUE=centroid, FALSE=foot).

The maximum confidence value that can be returned by this method for the smallest possible distance difference.

The minimum confidence value that can be returned by this method for the largest possible distance difference.

If the two paths can be linked, the returned confidence value is generated using the following formula:

$$RC=\text{Min Conf}+((\text{Max }SD-\text{Worst }SD)/\text{Max }SD)*(\text{Max Conf}-\text{Min Conf})$$

Where:

RC is the returned confidence value.

Min Conf is the minimum confidence parameter provided to the function as input.

Max SD is the maximum spatial distance parameter provided to the function as input.

Worst SD is the worst actual computed spatial distance (in inches) between any pair of points (one from each path) that share the same time instant.

Max Conf is the maximum confidence parameter provided to the function as input.

After the path linking methods have been selected, the system of the present invention iteratively performs path linking and path breaking. This process is performed repeatedly so that the system has the opportunity to build up larger paths than could not possibly be generated in a single pass.

Figure 8:
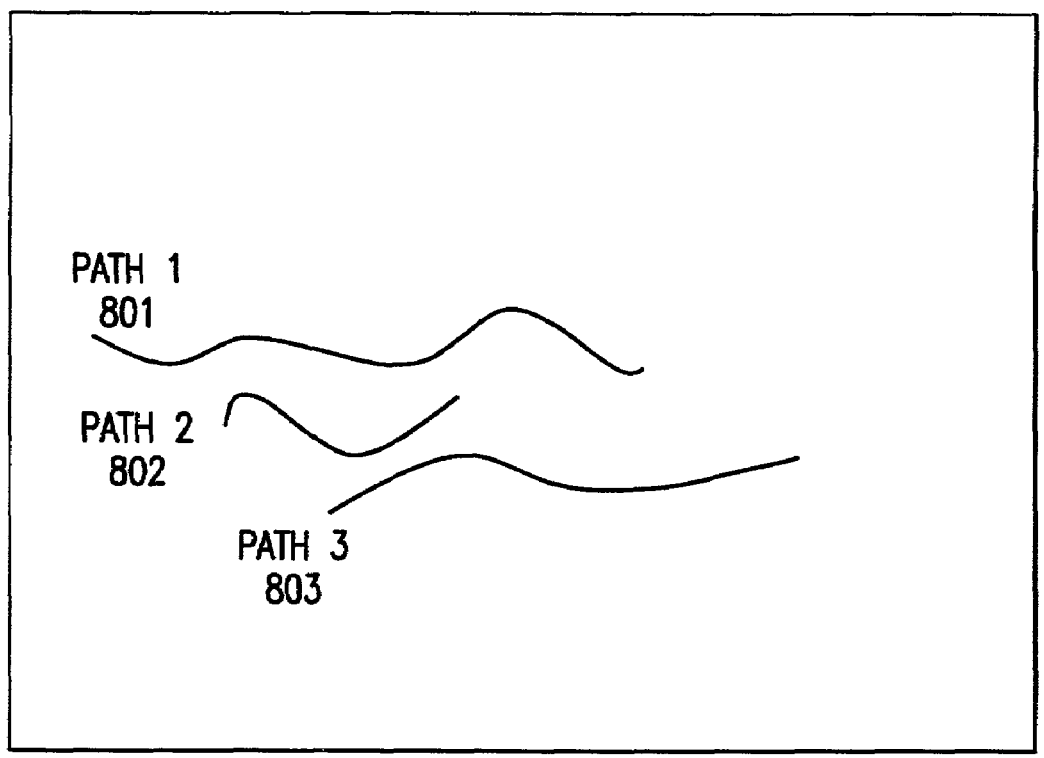

Consider the single scene example of FIG. 8. Paths 1 (801), 2 (802) and 3 (803) all represent the same individual who has broken up into three distinct tracks. Path 2 (802) is a subset of Path 1 (802), so IterOverlap_Scene will think it is a duplicate path and not link them together. However, Path 3 (803) and Path 2 (802) will be linked by IterOverlap_Scene because they are sufficiently close and overlap in time. Therefore, after the first iteration of path linking, there are two paths (Path 1, and Path 2+3) that represent a single person. If path linking is performed one more time, IterOverlap_Scene will be able to link Path 1 with Path 2+3, to yield a single path for the individual.

The path linking algorithm is an optimization technique that employs the confidence values generated by the path linking mechanisms to find the best set of linked paths across the entire set of scenes, or camera 110 views. The following describes the path linking algorithm.

Figure 9A:
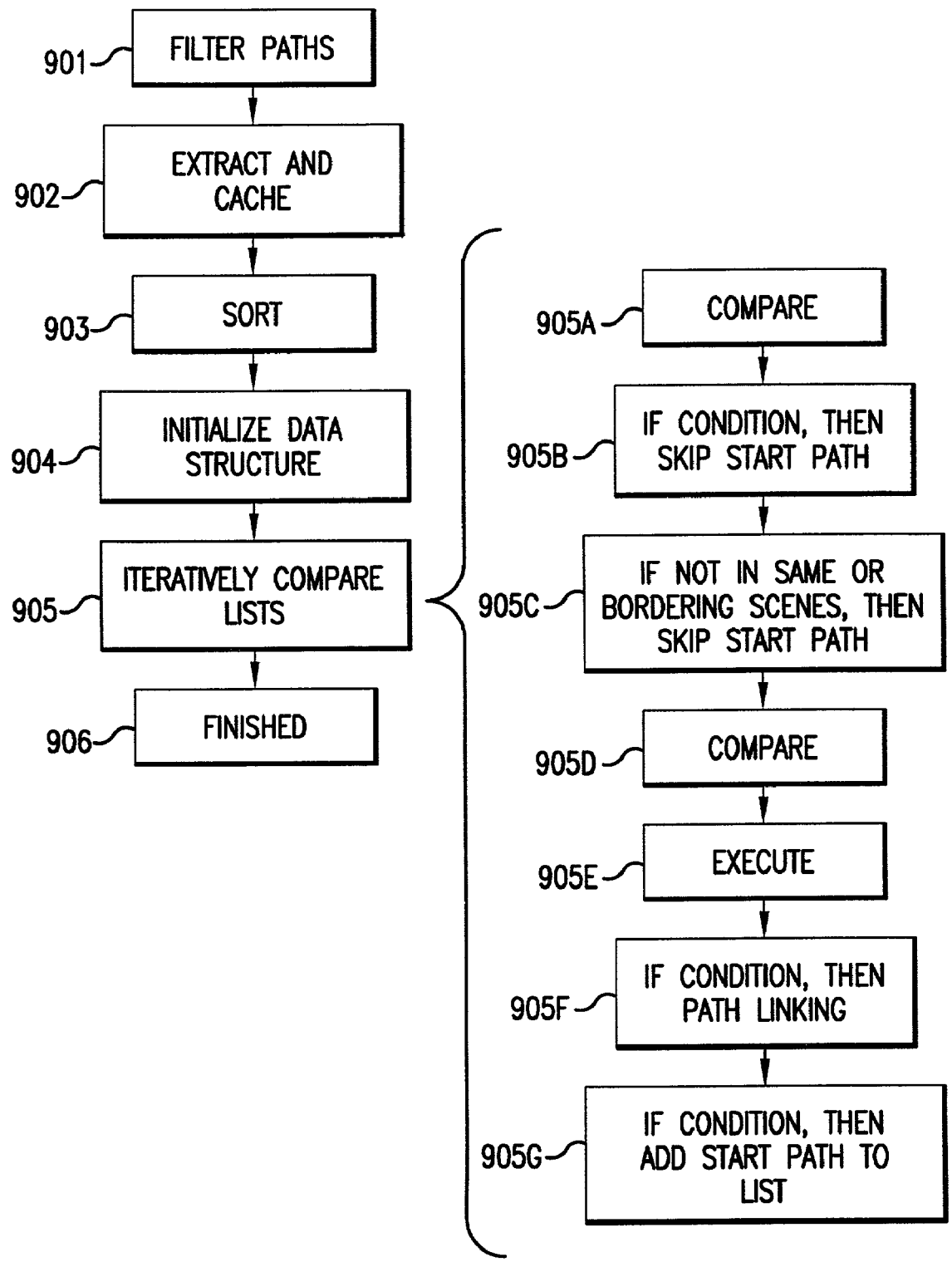
FIGS. 9A, 9B and 10 are flow diagrams depicting processes used for path linking in the present invention.
Figure 9B:
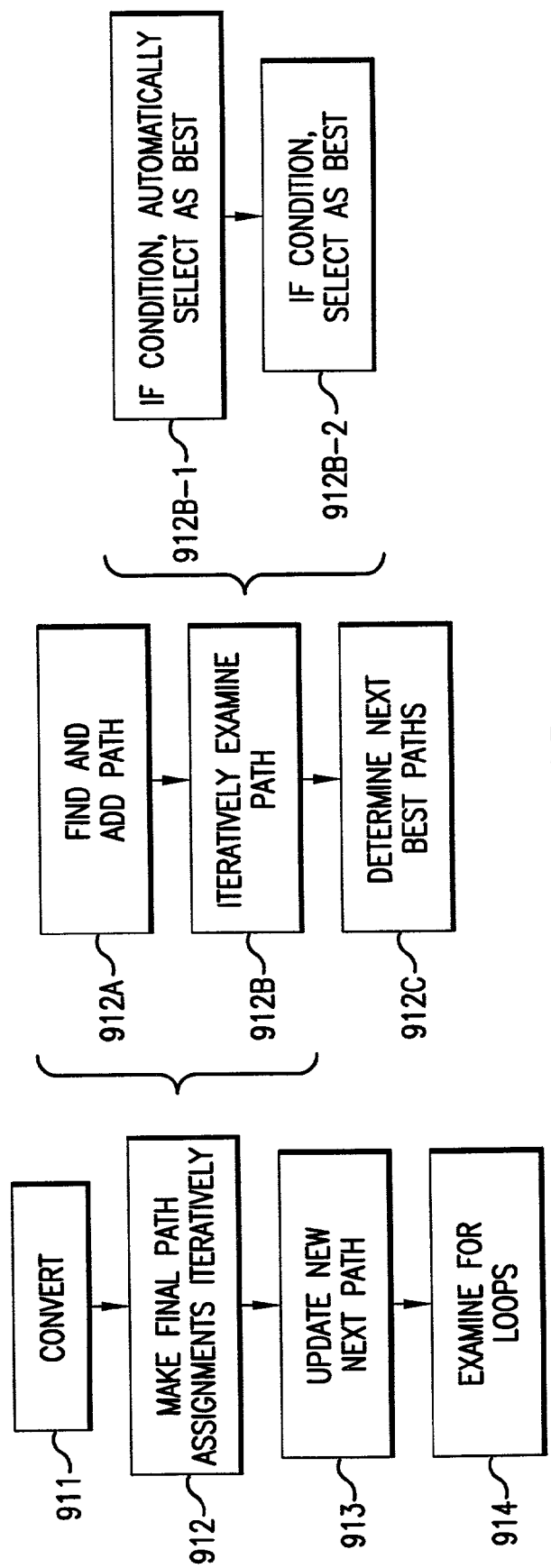

With references to FIGS. 9A and 9B, the path linking algorithm is separated into two main sections. In the first section, paths are tested to determine if they can be linked. In some cases, multiple paths may be able to link to the same path, causing a conflict. In the second section of this algorithm, the conflicts are resolved and the final path linking assignments are determined.

First Section: Path Testing

[901] The list of all paths is filtered in the following manner. Paths that are in the middle of larger linked paths are filtered out, because they have been linked in a previous pass of the algorithm.

[902] Data elements from each path in the filtered path list are extracted and cached for rapid access during the optimization process. The elements include: the last point on each path, and the total path length of each cache.

[903] The filtered path list is sorted twice. The first sorted list, called endTimeSortedPaths is the filtered path list sorted by the time of the last point of each path. The second sorted list, called startTimeSortedPaths is the filtered path list sorted by the time of the first point of each path. Sorting the filtered path list allows for more rapid comparisons during optimization.

[904] A data structure, resultSet, is initialized. For each filtered path, resultSet contains the list of all possible paths that this path can link to (called currentInfoArray), as determined by testing all path pairs in the loop below.

[905] The paths on the endTimeSortedPaths list are iteratively compared to the paths on the startTimeSortedPaths list. This is accomplished by two loops, with endTimeSortedPaths list in the outside loop and startTimeSortedPaths list in the inside loop. Each comparison executes the following steps on a pair of paths, one selected from endTimeSortedPaths, called endpath, and the other selected from startTimeSortedPaths, called startpath.

[905A] The first point on startpath is compared to the last point on endpath. If the time between the two points is positive and too large, the inner loop is broken. This indicates that endpath ends well before startpath starts, so no further paths on startTimeSortedPaths list should be considered link candidates for endpath.

[905B] Conversely, if the time between the two points is negative, and the magnitude is sufficiently large, startpath is skipped. This indicates that startpath starts well before endpath ends, so it is unreasonable to believe that these to paths could be linked together.

[905C] If endpath and startpath are not in the same Scene and are not in Scenes that border each other, then startpath is skipped because no linking is possible.

[905D] The first point on endpath is compared to the last point on startpath. If the time between the two points is positive and too large, then startpath is skipped. This indicates that endpath starts after startpath ends, so no linking is possible.

[905E] Finally, the same Scene linking test is executed. If endpath ends in the same Scene that startpath starts, and same Scene linking is not allowed for endpath (as determined by the Fringe Percentage), then startpath is skipped.

[905F] If all the tests above are passed successfully, then the two paths are subjected to the path linking mechanisms to see if the paths can actually be linked together. Based on the whether or not the paths are within a single Scene or cross multiple Scenes, the algorithm automatically selects which set of available path linking mechanisms to apply. The mechanisms are then applied individually. The result from the mechanism that returns the highest confidence is retained.

[905G] If the paths can be linked together then startpath is added to the list of paths to which endpath can link. This information is added to currentInfoArray, which is an element of resultSet.

[906] For each path, currentInfoArray now contains the list of paths to which it can link. currentInfoArray is sorted, with the best possible link placed on the top of the list.

Second Section: Conflict Resolution

[911] The information in currentInfoArray is converted into a new structure called conflictSet. This structure contains a set of conflictLists, one for each filtered path. For a given path, conflictList represents all the paths that have selected that path as the most likely next path for linking. In other words, each path on a conflictList would like to assign its next PL_Path pointer to the given path. For a given path, if conflictList contains only one path, then there is no conflict for that path and the link is assigned. If there are multiple paths on the list, the optimization algorithm must determine which path to select as the final link assignment.

[912] The following iteration occurs to make final path assignments for those conflictLists that contain multiple paths. The iteration continues until all assignments are made.

[912A] All of the conflictLists with multiple paths in conflictSet are searched to find the path that has the highest link confidence. There may be multiple paths that have the same link confidence. Each of these paths are added to a cleaned list called resultList.

[912B] Each path on resultList is iteratively examined.

[912B-1] If a path on the list has no alternative paths to link to (determined by examining currentInfoArray for that path), it is automatically selected as the best path for linking and the iteration stops.

[912B-2] If all paths have second choices, the path with the largest confidence difference between the current choice and its second choice is selected as the best path for linking.

[912C] Once a path is selected, all other candidates on the current resultList are not allowed to link to this path, so the next best paths are determined for each of these paths by examining their currentInfoArrays. The corresponding resultLists are updated to include these paths.

[913] Once the final path assignments have been made, each PL_Path object that has a new next path is updated to reflect:

The next PL_Path pointer (and that paths previous PL_Path pointer).

The link confidence.

The link method used.

[914] All newly linked paths are examined for loops (A→B→C→A). If these occur, they are broken (A→B→C).

Path linking is not perfect. It may link together paths that represent two people, creating an error condition. To compensate for this potential problem, a path breaking algorithm is executed after each path linking iteration to remove links that have a sufficient likelihood of being in error. Path breaking compares two paths at a time, looking closely at the areas in which linking has occurred on the two paths. It there may be confusion due to close proximity (within a time-space bubble) between links on both paths, the algorithm breaks each paths' links at the point of possible confusion.

Path breaking requires the following parameters:
A time maximum in seconds (int).
A distance maximum in inches (int).
A (bool) flag to indicate whether the centroid (TRUE) or the foot position (FALSE) is used.

Figure 10:
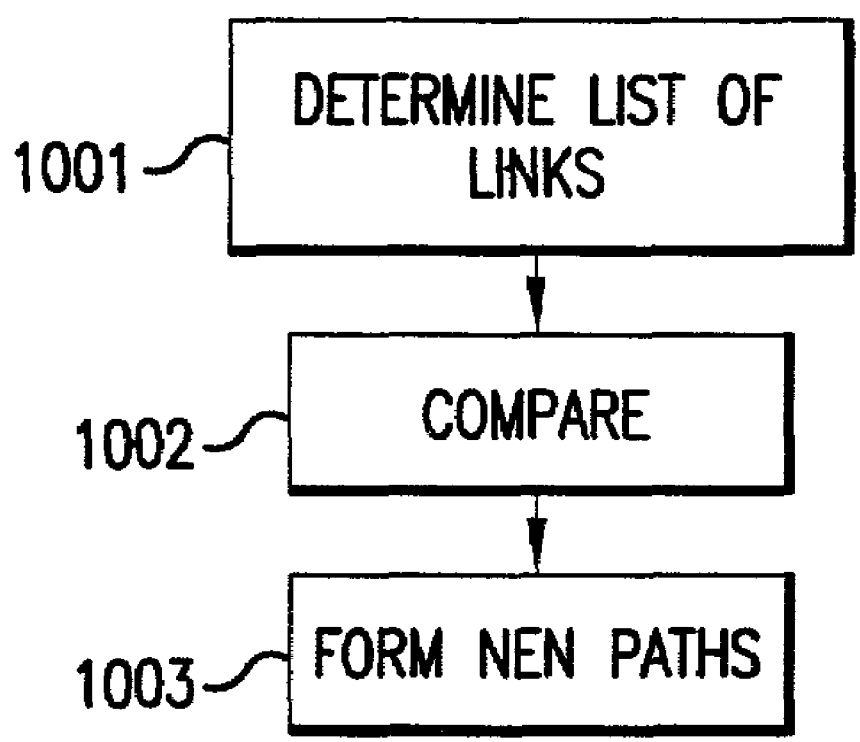

With respect to FIG. 10, the algorithm performs the following steps.

[1001] The list of links for each pair of paths is determined.

[1002] Each point before and after a link for one path is compared to each point before and after a link for the second path. If the points are sufficiently close, within the time-space bubble as determined by the parameters, then both paths are broken at that link.

[1003] If the paths are broken, new paths are formed at the break point.

Multi-Camera Calibration and Transformation to Real World Coordinates

In order to determine the real world distance in inches of a location in one camera to the same camera or a second camera, a mechanism to convert from an image space coordinate system to a real world coordinate space is required. The following procedure defines how to create this transformation. The following procedure takes into account that in a multi-camera system 210, the relation between cameras 110 is most important on overlapping cameras. If different cameras 110 do not overlap, it doesn't make sense to try to precisely relate the tracks' relative positions and directions.

1. The number of cameras to use is selected, and each is installed according to plans, taking care to leave a significant view overlap (i.e. 15%) whenever tracking has to be continued from one camera scene to another. The cameras should be in their final position.

2. Calibrate each camera individually, with the well known procedure defined in U.S. Pat. No. 6,185,314, System and Method for Matching Image Information to Object Model Information.). Once this procedure is performed, each camera will have an associated set of measures:

| | |
|---|---|
| Camera Declination Angle, in radians: | θ |
| Camera Height, in inches: | h |
| Image Width semi-Angle, in radians: | Δ |
| Image Height semi-Angle, in radians: | α |
| Camera Focal Length, in inches: | d |

Using these parameters, for any camera, any point's Image Coordinates can be transformed into (camera's local) Real World Coordinates, with:

$y_{rw} = h/[\tan(\theta - \beta)]$; where $\beta = \text{atn}([(y_{center} - y) * \tan(\alpha)]/y_{center})$ $x_{rw} = D_h * (x - x_{center}) * \tan(\Delta)/x_{center}$; where $D_h = \text{sqrt}(y_{rw} * y_{rw} + h*h)$ And Real World Coordinates can be transformed into Image Coordinates, with:

$y = y_{center} - [y_{center}/\tan(\alpha)] * \tan[\theta - \text{atn}(h/y_{rw})]$ $x = [x_{rw}/D_h] * [x_{center}/\tan(\Delta)] + x_{center}$ For each pixel to be transformed from image to real-world coordinates there is a resolution error associated with it. This error, given in inches, is calculated as follows: Transform all 4-connected pixels around the pixel under study, to obtain their real-world coordinates. Then compute the distance from each of the resultant 4 points to the point of interest, and choose the maximum as the error. This error accounts for both errors in mouse clicking and errors in location given by not enough resolution of the images. The more distant is a given point from the camera, the largest will be its associated error.

3. Select one camera as the "main" camera. All other cameras' coordinates and orientation will be relative to this camera. Enumerate all cameras. The main camera should be #1.

4. Steps 4 and 5 first described using 2 points in the overlap areas, then extended to N points. Mark 2 points at the main camera scene. One displays an image, and with the mouse, the user should click first on the first point and then on the corresponding second point. The program then calculates the (local) real world coordinates for these points, $(x_1, y_1)$ and $(x_2, y_2)$, by the transformation given in step (2.) [Note, from this point forward, the sub-indexes to indicate "real-world" have been removed, since all of the coordinates refer to real-world coordinates.] The program then requests the global (that is, not relative to the local camera scene, but to the actual floor) real world coordinates of these points, which should be assigned or measured by hand: $(X_1, Y_1)$, $(X_2, Y_2)$. The camera orientation c of this camera with respect to the global real world coordinate system is then calculated as:

$\omega = a\tan 2\{(Y_2 - Y_1)/(X_2 - X_1)\} - a\tan 2\{(y_2 - y_1)/(x_2 - x_1)\}$ And the origin $(Xg_c, Yg_c)$ of this camera's real-world coordinate system in terms of the global system is calculated by:

$X_{gc} = X_1 - x_1 \cos(\omega) + y_1 \sin(\omega)$ $Y_{gc} = Y_1 - y_1 \cos(\omega) - x_1 \sin(\omega)$ 5. For all the other camera scenes, the orientation and position of the camera will be obtained relative to another camera's coordinate system, already known, presenting some overlap with this camera view.

The procedure is as follows: One possible implementation displays 2 images on the screen. The program asks the user to mark, in both images, point 1, and then, point 2. The coordinates are then transformed into (local) real-world coordinates. Thus, we have: For the camera under calibration, $(x_1, y_1)$ and $(x_2, y_2)$, and for the camera already calibrated, $(X_1, Y_1)$, $(X_2, Y_2)$. From here, (o, the angle of the new camera in terms of the other one, is calculated as:

$\omega = a\tan 2\{(Y_2 - Y_1)/(X_2 - X_1)\} - a\tan 2\{(y_2 - y_1)/(x_2 - x_1)\}$ And the origin of the local coordinate system $(X_1, Y_1)$ of the new camera relative to the local coordinate system of the other one is given by:

$X_c = X_1 - x_1 \cos(\omega) + y_1 \sin(\omega)$ $Y_c = Y_1 - y_1 \cos(\omega) - x_1 \sin(\omega)$ 6. The position and orientation of all cameras with respect to the global coordinate system can be obtained by summing the angles and local origin coordinates of all cameras used to calibrate the specified camera. Recursively:

$\omega_N = \omega_{N-1} + \omega_N$ $X_{Nc} = X_{(N-1)c} + X_{Nc}*\cos(\omega_{N-1}) - Y_{Nc}*\sin(\omega_{N-1})$ $Y_{NC} = Y_{(N-1)c} + Y_{Nc}*\cos(\omega_{N-1}) + X_{Nc}*\sin(\omega_{N-1})$ Where boldface refers to absolute coordinates, and N is the number of camera scenes used to calibrate the current (thus $N^{th}$) camera. For example, if a camera is the $3^{rd}$ in the path from the main camera, its absolute parameters will be calculated as follows:

$\omega_3 = \omega_1 + \omega_2 + \omega_3$ $X_{3c} = X_{1c} + X_2*\cos(\omega_1) - Y_2*\sin(\omega_1) + X_3*\cos(\omega_1+\omega_2) - Y_3*\sin(\omega_1+\omega_2)$ $Y_{3c} = Y_{1c} + Y_2*\cos(\omega_1) - X_2*\sin(\omega_1) + Y_3*\cos(\omega_1+\omega_2) - X_3*\sin(\omega_1+\omega_2)$ 7. The results of this multi-camera calibration procedure are incorporated into the actual Path Linking system. Each single camera descriptor could have a list of the other systems that overlap with its view, and a simple transformation to go back and forth between both local real-world coordinate systems, given by a rotation and a translation.

As mentioned previously, each point in real-world coordinates has an associated resolution error, which can contribute to errors in the calculation of relative angles and relative coordinate origins on multi-camera calibration.

In order to estimate errors, the two main equations for calculating the origin location and orientation of a camera in terms of its "parent" camera are restated, with a more suitable notation:

$\omega = a\tan 2\{(Q.y-P.y)/(Q.x-P.x)\} - a\tan 2\{(q.y-p.y)/(q.x-p.x)\}$ $X_c = P.x - p.x*\cos(\omega) + p.y*\sin(\omega)$ $Y_c = P.y - p.y*\cos(\omega) - p.y*\sin(\omega)$ Where points "p" and "q" are the two points for the camera under calibration and "P" and "Q" are the 2 points for the camera already calibrated. [Coordinates for any point "p" are indicted as (p.x,p.y)].

Consider one of the terms for $\omega$:

$a\tan 2\{(Q.y-P.y)/(Q.x-P.x)\}$

Figure 12A:
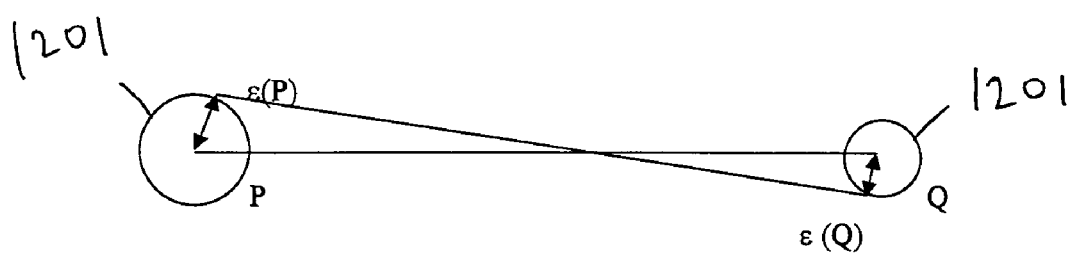
FIGS. 12A and 12B are diagrams depicting certain calibration techniques that may be used with the present invention.
Figure 12B:
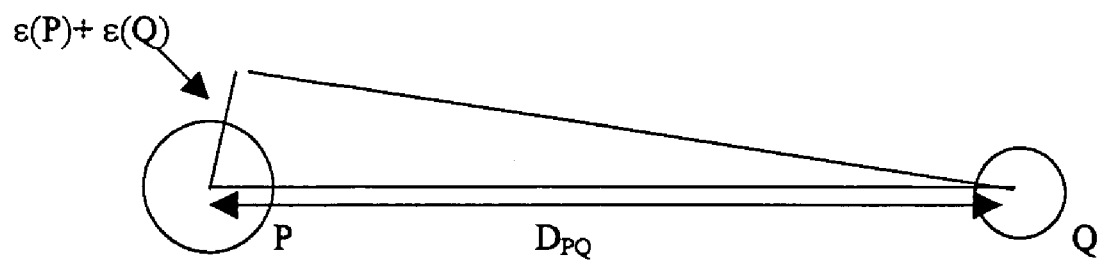

Each point has an associated error in inches. With respect to FIG. 12A, these errors can be represented by circles 1201 of given radius around the points. The maximum error in angle is represented. As shown in FIG. 12B, by redrawing it, we can calculate its value.

The angular error will be given by $\sin[\epsilon(P) + \epsilon(Q)]$

And the max. error in $\omega$:

$\epsilon\{\omega\} = \sin[\square) + \epsilon(Q)] + \sin[\epsilon(p) + \epsilon(q)]$ The error on $X_c$ will be given by:

$\epsilon\{X_c\} = \epsilon\{P\} + \epsilon\{p\}*MAX\{|A-A_p|, |A-A_m|\}$, where:

$A = \cos(\omega) - \sin(\omega)$ $A_p = \cos(\omega + \epsilon\{\ \}) - \sin(\omega + \epsilon\{\omega\})$ $A_m = \cos(\omega - \epsilon\{\omega\}) - \sin(\omega - \epsilon\{\omega\})$ And a similar error is defined for $Y_c$.

It is expected that by using more points in the overlapping areas to perform multi-camera calibration, the results will be more accurate. One approach for using more than two points is to make use of the formulations for 2 points, selecting pairs of points at a time, and averaging the results to obtain the more accurate calibration parameters.

If N points are selected in the overlap area between two camera 110 scenes, the procedure for obtaining the average orientation angle ω of the camera 110 under calibration with respect to the camera 110 already calibrated will be to first obtain ω using points 1 and 2, then using points 1 and 3, . . . then using points 1 and N, then points 2 and 3, . . . and then points N-1 and N, and to average the results to obtain the estimated orientation angle ω. However, averaging angles directly turns out to be a difficult task giving rise to several kinds of problems. One possible problem, for instance, is the following: Assume we are trying to average two angles that differ by 2 degrees: ω=179 and ω=−179. The arithmetic average turns out to be zero, while our desired result is clearly 180 degrees. Our approach instead adds the angles vectorially, and then takes the resultant angle as the average.

The procedure in pseudocode is:

For i=to N-1,
    For j=i to N,
        omega=getOmega(p[i], p[i], P[i], P[j]); (PROCEDURE DESCRIBED BEFORE.)
        x=x+cos(omega)
        y=y+sin(omega)
    end
end
omega=atan2(y/x)

The calculation of the average relative Xc and Yc coordinates of the origin of the camera scene under calibration relative to the camera scene already calibrated does not present any problem when using N points in the overlapping areas, so a regular averaging can be performed:

```
For i = 1 to N,
    Xc = Xc + getXc(p[i],P[i],omega)        (ALREADY
                                             DESCRIBED)
    Yc = Yc + getYc(p[i],P[i],omega)          " "
End
Xc = Xc/N
Yc = Yc/N
```

From probability theory, it is known that if we have N independent and identically distributed random variables with mean μ and a standard deviation σ, its average will have a mean μ as well, but its standard deviation will be reduced to σ/sqrt(N). Although this concept cannot be applied directly to our calculations since the system is dealing with maximum errors instead of standard deviations and we do not have id variables, intuition tells us that the errors will be reduced in a similar form in which the standard deviation is reduced, in general, unless the maximum possible error happens to occur in each of our terms, something very unlikely.

T estimated maximum error for an average is defined as the maximum error for any individual term divided by the square root of the number of terms in our calculation. The choice of the maximum of the individual error is made to be safe (the errors for each of the terms is different). This is the way in which errors due to resolution are estimated in our calibration procedure.

It is possible that other kinds of errors are present in our calculations, giving rise to errors larger than the estimated maximum errors described above. These errors might have several causes, among those, there are: errors produced in calibration of individual camera system, producing erroneous values for the θ, α, Δ, and h parameters for the camera, non-accounted image warping, etc.

During multicamera calibration, when calculating angles or offset origins using points or pairs of points, if differences larger than the maximum estimated errors are observed (between calculations with different points or pairs of points), it is assumed that other kind of error has occurred, and the maximum estimated error itself is set to this observed value.

3. Track Analysis

The path input file 240 is the output of the path linking step 220. Each path in the file is stored in the following format.

The Path ID (int)

The number of points on the path (int)

A character buffer of path points, where each path point is of type PL_InstantStruct, defined by:

```
struct PL_InstantStruct{
    PL_IntPoint m_position;    // the real world position
    CTime m_time;              // the time instant of the
                                  point
    int m_pathID;              // a reference to the path
                                  ID
};
struct PL_IntPoint{
    int x;
    int y;
};
``` where PL_IntPoint is defined by:

The Track Analysis subsystem provides the following capabilities:

- Interprets a single path in terms of what areas in the scene the person visited and how long they remained in that area. For example, when a person entered or exited a queue. The output is a simple report of areas visited and length of time an area was visited.
- Grouping of tracks based on common behaviors or activities. For example, identify all tracks of people that visited a product display.
- Filtering of spurious tracks based on various constraints, i.e. discarding tracks of people that did not originate or terminate from a point of ingress or egress.

In order to perform Path/Track Analysis, the following elements, explained in detail below, are required as input:

- A floorplan that consists of a jpeg or bitmap file rendering of the physical environment being monitored with the video cameras, with each pixel representing some number of inches in the floorplan, i.e. a scale specifier.
- An Analysis Region database that defines the type and location of regions, areas of interest, on the floorplan.
- A real world path file 240.

On output, the Track Analysis system may provide.

- A report of where individuals went and spent time in the physical environment.
- A report of the number of individuals to visit an area, as well as various statistics with regards to amount of time spent in the area.
- A file that consists of paths sharing a common behavior.
- Other relevant analytical information.

The path input file is the output of the path linking step (240). Each path in the file may be stored in the following format.

The Path ID (int)

The number of points on the path (int)

A character buffer of path points, where each path point is of type PL_InstantStruct, defined by:

```
struct PL_InstantStruct{
    PL_IntPoint m_position;    // the real world position
    CTime m_time;              // the time instant of the
                                  point
    int m_pathID;              // a reference to the path
                                  ID
};
``` where PL_IntPoint is defined by:

```
struct PL_IntPoint{
    int x;
    int y;
};
```

Figure 11A:
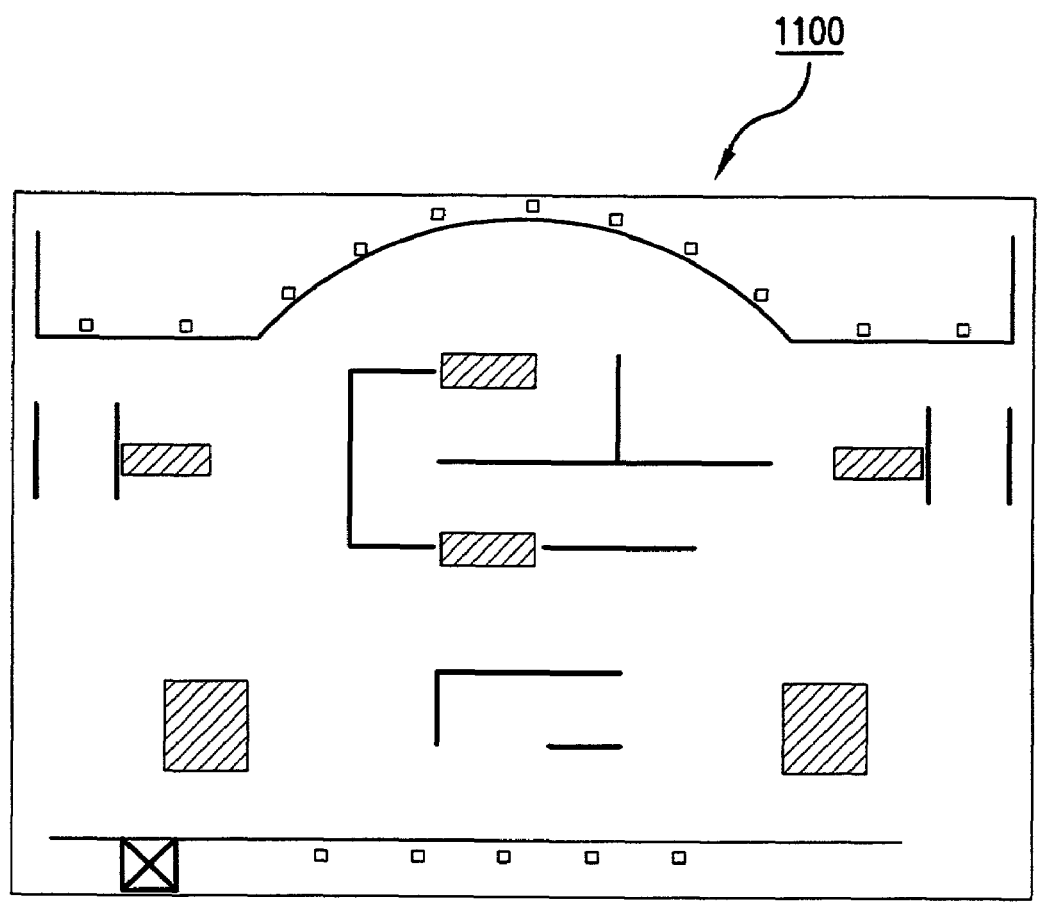
FIGS. 11A, 11B and 11C depict example physical floor plans that may be used with the present invention.

The floorplan for the physical environment can be created with any tool that allows an end user to create a floorplan which is drawn to a real world scale. An example tool is Microsoft Visio 2000. The purpose of the floorplan is so that analysis regions of interest can be created and referenced in the context of the real world environment being monitored. FIG. 11A depicts a sample floorplan diagram 1100 for a bank branch.

Figure 11B:
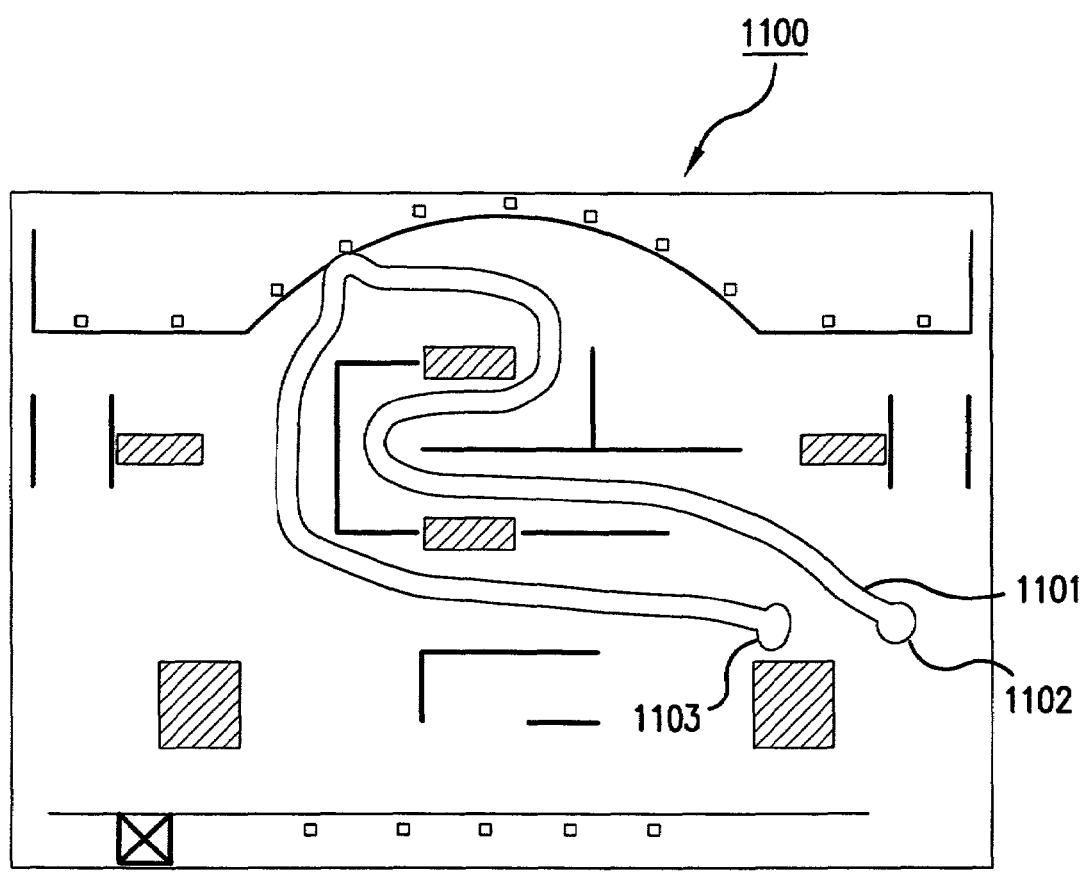

Referring to FIG. 11B, an individual path 1101 can be overlayed in the context of the floorplan. 1102 represents the start of the path and 1103 represents the end of the path.

Analysis regions are areas in the floorplan where specific types of customer activities may occur. For example, the area around a teller window where people are served may be an analysis region. A queue area is a second example of an analysis region. Any number of arbitrary regions can be defined with respect to the floorplan. For example, in a retail store, a region may represent a complete department, a category of products, such as softdrinks, or a specific set of products, such as Coke.

Figure 11C:
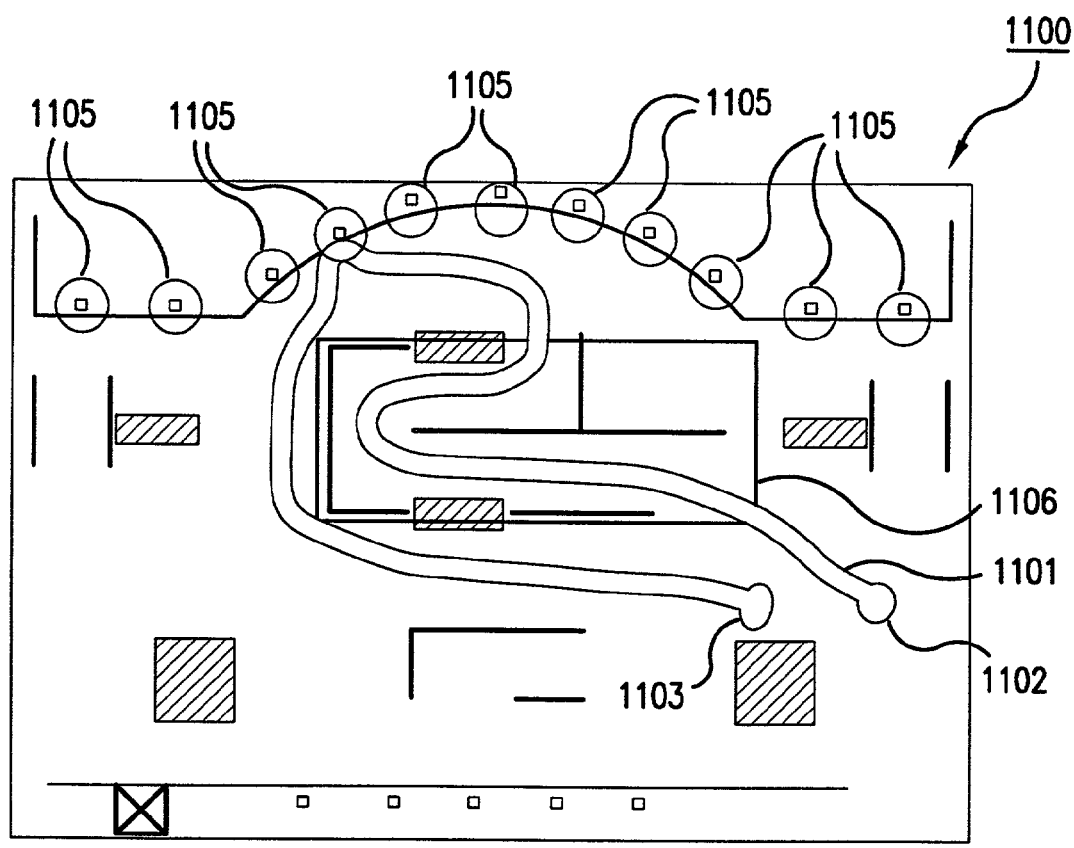

Regions can be depicted in the shape of a rectangle or an ellipse, denoting an area of interest on the floorplan. A graphical example of several analysis regions is shown in FIG. 11C. In this figure, the ellipses 1105 represent teller locations and the rectangle 1106 represents a queue. It is now possible to analyze the individual paths within the context of the analysis regions. This process is described in further detail later.

An analysis region can be represented by the following data structure.

```
int        nID;            // region identifier
Rect       rect;           // rectangle descriptor
Ellipse    ellipse;        // ellipse descriptor
CString    sDescription;   // region descriptor
Int        nType;          // Rectangle/Ellipse
```

An individual path is an ordered list of tuples containing the following information.

<timestamp, x-coordinate, y-coordinate>

The first tuple is referred to as the point or origin for the path. The last tuple is referred to as the termination point for the path. By simple analysis of the point of origin, termination point, and consecutive tuples in the list, it is possible to make the following observations.

If a path at some time T1 is outside of an Analysis Region and at T1+1 is inside of the Analysis Region, then the path is said to have Entered the Analysis Region at time T1+1.

If a path is inside an Analysis Region at time T1 and is outside of the Analysis Region at time T1+1, then the path is said to have Exited the Analysis Region at time T1+1.

If a path originated at time T1 and is inside of the Analysis Region, then the path is said to have Started in the Analysis Region at time T1.

If a path terminated at time T1 and is inside of the Analysis Region, then the path is said to have Ended in the Analysis Region at time T1.

The following algorithm is used to generate a track report.

```
N = number of samples
for (i = 0; i < n; i++)
{
    time = timestamp for point I
    x = current x-coordinate
    y = current y-coordinate
    // determine location
    thisRegion = -1;
    for (j = 0; j < m; j++)
    {
        if ( point(x,y) is inside Region[j] )
        {
            thisRegion = j;
        }
    }
    // Determine if an event should be output
    if ( lastRegion != thisRegion )
    {
        if ( lastRegion != -1 )
            output: Exited Region lastRegion at time
        if ( thisRegion != -1 )
        {
            if ( i = 0 )
                output: Started Region thisRegion at time
            else
                output: Entered Region thisRegion at time
        }
    }
    lastRegion = thisRegion;
}
if (lastRegion != -1 )
    output: Ended Region thisRegion at time
```

For the previous example floorplan and path, the output record set would contain the following.

Entered Queue 1106 at T1
Exited Queue 1106 at T2
Entered Teller 1105 at T3
Exited Teller 1105 at T4

One obvious limitation of the algorithm above is that if an individual passes through a region for only a short period of time, the event is reported. For example, an individual may pass through multiple teller regions when walking to the teller that will ultimately provide the service. In general, a mechanism is required to filter false events that may be caused by individuals passing through a zone for a short period of time. Two methods may be used: applying a time threshold and/or detecting a Stop state.

A time threshold can be associated with each region such that an event is reported only if the path remains in the region for some time greater than N seconds. This time is computed by subtracting the time of the Entered event from the time of the Exited event. The Analysis Region data structure is extended to contain the following data element.

int nMinTime;

The second method for filtering false events is to define and detect a Stop state. Two constraints may be applied in order to define a stop state.

maximum velocity: the maximum velocity, in inches per second, that an individual may not exceed to be deemed in a Stop state.

minimum time: the minimum amount of time, in seconds, that the individual must maintain the maximum velocity constraint.

The Analysis Region data structure is extended to contain the following data elements.

| int | nMaximumStopVelocity; |
| int | nMinimumStopTime; |

A second limitation of the reporting algorithm is the ability to manage the occurrence of multiple events occurring sequentially in time for the same region. This occurs when an individual is on the boundary of the Analysis Region and is moving in and out of the Analysis Region. In this instance, the report may contain multiple short events for the same region. For example, assume an individual entered the Analysis Region at 10:10:05, departed the region at 10:10:55, entered the region at 10:10:57, and remained in the region until 10:12:05. A second example is described in the table below.

| Region | Enter | Exit | Time In |
|---|---|---|---|
| Queue | 10:10:05 | 10:10:08 | 3 |
| Queue | 10:10:11 | 10:10:14 | 3 |
| Queue | 10:10:16 | 10:10:25 | 9 |
| Queue | 10:10:27 | 10:10:33 | 6 |
| Queue | 10:10:38 | 10:10:45 | 7 |

While the individual maximum time in the zone is 9 seconds in the table above, it is readily apparent that the person was in the zone from 10:10:05 until 10:10:45, or 40 seconds.

Rather than reporting two or more distinct events, the system should merge the events into a single event. This can be done by searching the report for multiple events that occur in sequence for the same region. The Analysis Region data structure is extended to contain the following data element.

int nMergeThreshold;

If the time between two sequential events for the same zone is less than the merge threshold, the two events should be merged into a single event.

By associating an activity with each Analysis Region, it becomes possible to identify types of behaviour. Typical types of behavior that may be of interest in a bank branch are: (1) customers performing self-service transactions, (2) customers performing transactions at staffed service points, and (3) customers leaving the bank without visiting a service point. Examples of classes of customer behavior in a retail store are: (1) a customer leaves the store with-out visiting a checkstand, (2) a customer shopping in a department or product category, (3) a customer waiting to checkout.

In order to detect types of behavior, activities are associated with each Analysis Region. In a bank branch, the activity associated with a queue is the customer is waiting for service. The activity associated with an ATM is the execution of a self-service transaction, while the activity associated with a Teller is the execution of a staffed transaction.

By analyzing the sequence and type of activities performed by the individual, it is possible to identify basic types of behaviors. The methodology used for analyzing and identifying types of behaviors or activities is that of the regular expression. The set of symbols, or the alphabet, may be created from the set of analysis regions or the set of activities. For example, one alphabet may consists of the set of regions and the possible states, Entered, Exited, Start, Stop. The table below describes the alphabet for the bank branch previously described.

| Region | State | Alphabet |
|---|---|---|
| Queue | Entered | A |
| Queue | Exited | B |
| Queue | Start | C |
| Queue | Stop | D |
| Teller | Entered | E |
| Teller | Exited | F |
| Teller | Start | G |
| Teller | Stop | H |

The Track Report algorithm is updated to generate as output symbols from the defined alphabet. In order to identify a type of behavior, a regular expression is defined and the output is parsed to search for a match on a regular expression. For example, the regular expression that defines the behavior of waiting in a queue and being served at a teller is ABCD. This describes any path that enters and exits the queue and then enters and exits a teller location. A second example is the set of customers that wait in the queue and then visit two teller locations. This would be $AB(CD)^2$. By exploiting the minimum time constraint, it is possible to identify customer paths that experienced poor service. For example, if a queue wait time greater than 300 seconds is considered poor service, the minimum time constraint for the queue zone can be set to 300. The Track Report algorithm only generates a Queue Entered and Queue Exited event if the person was in the region (Queue) for greater than 300 seconds. Now, the regular expression ABCD will only match paths of people that were in the queue greater than 300 seconds.

The alphabet for the regular expression parser can consist of symbols for every region of analysis in the floorplan, i. Teller 1, Teller 2, etc., or for classes of regions, such as Tellers in general. This can be supported with the simple addition of a class descriptor to the region of analysis. Employees can be identified by defining areas that only employees may visit and then defining a grammar that describes employee activities. Similarly, an alphabet can be constructed from the set of behaviors that are associated with each region of analysis.

Similar to identifying types of behaviour, it is also possible to identify paths that may have been erroneously generated by the Single Tracking system by analyzing where the track originated, terminated, and where the track moved in the scene. For example, complete paths can be identified by creating a large region of analysis on the floorplan which encompasses all areas monitored by the camera with the exception of some border areas. In order to identify paths that may be incomplete due to errors in the Single Camera system, paths that originate inside this region are incomplete.

Three types of output may be produced by the Track Analysis system.

A report of how where individuals went and spent time in the physical environment.

A report of number of individuals to visit an area, as well as various statistics with regards to amount of time spent in the area.

A file that consists of tracks sharing a common behavior.

An individual track report can be generated by outputting the results of track interpretation. For each track, an example report would consist of list of records containing Path ID, Region visited, and start time and end time for each region visited An example report is shown below in a tabular structure that can be easily loaded into a relational database management system.

| Path ID | Region | Start | End |
|---|---|---|---|
| 1 | Path | 10:10:47 | 10:17:07 |
| 1 | Queue 1 | 10:11:05 | 10:14:07 |
| 1 | Teller 1 | 10:14:12 | 10:16:59 |
| 2 | Path | 10:10:52 | 10:16:57 |
| 2 | Queue 1 | 10:11:13 | 10:12:00 |
| 2 | Teller 7 | 10:12:02 | 10:16:40 |

By querying the individual track reports, it is possible to generate statistics with respect to each region of interest. The number of people to visit a region is calculated by counting the number of individual track reports that contain a record of a visit for the target region. The total number of people in a region at any moment in time can be calculated by counting the number of individual track reports where start time<time of interest<end time.

The calculation for the average amount of time a person spends in a particular region is shown below.

$$\left( \sum_{i=0}^{i<NumberOfTracks} (EndTime_i - StartTime_i) \right) \Big/ NumberOfTracks.$$

The specification for the present invention provided above is intended to describe an implementation of the present invention in known and preferred embodiments, and is not intended as an exhaustive description of every possible way to implement the invention. For example, the present invention may be used in a countless variety of situations where people, animals or objects are to be tracked and analyzed, and a variety of different methods may be used for analyze and utilizing the resulting data.

The invention claimed is:

1. A computer-readable medium encoded with a computer program representing instructions to cause a computer to:

analyze information used to define a first path, the information used to define the first path including a first plurality of data elements, each data element from the first plurality of data elements associated with the first path including a spatial value and a time value, each spatial value associated with the first path indicating a position of a person associated with the first path at a time associated with the corresponding time value;

analyze information used to define a second path, the information used to define the second path including a second plurality of data elements, each data element from the second plurality of data elements associated with the second path including a spatial value and a time value, each spatial value associated with the second path indicating a position of a person associated with the second path at a time associated with the corresponding time value, the spatial values used to define the second path including spatial values not included in the information used to define the first path;

determine, at least partially based on the analysis of the information used to define the first path and the analysis of the information used to define the second path, if the person associated with the first path and the person associated with the second path are the same person; and remove a data element from the first plurality of data elements when the data element is associated with an exclusion region, the data element associated with the exclusion region being removed based on a region of interest filter, the data element being removed to prevent linking of the first path with the second path based on the data element.

2. The computer-readable medium of claim 1, wherein the computer program further representing instructions to cause the computer to:

output information used to define a third path, if it is determined that the person associated with the first path and the person associated with the second path are the same person, the information used to define the third path including the plurality of spatial values used to define the first path and at least a portion of the plurality of spatial values used to define the second path thereby creating a path representing a limiting of the first and second paths.

3. The computer-readable medium of claim 1, wherein the information used to define the first path is information from a video image associated with the first path, each spatial value used to define the first path being a spatial value within the video image used to define the first person, the information associated with the second path being information from a video image associated with the second path, each spatial value used to define the second path being a spatial value within the video image.

4. The computer-readable medium of claim 3, wherein the computer program further representing instructions to cause the computer to:

convert each spatial value used to define the first path to a spatial value within a universal coordinate system; and convert each spatial value used to define the second path to a spatial value within the universal coordinate system.

5. The computer-readable medium of claim 1, wherein the computer program further representing instructions to cause the computer to:

determine a confidence value that the person associated with the first path and the person associated with the second path are the same person, the computer program representing instructions to cause the computer to determine if the person associated with the first path and the person associated with the second path are the same person being configured to make a determination at least partially based on the confidence value.

6. The computer-readable medium of claim 1, wherein the computer program representing instructions to cause the computer to determine if the person associated with the first path and the person associated with the second path are the same person includes instructions to determine at least whether an end spatial value of the first path is within a predetermined distance of a start spatial value of the second path, an end spatial value of the first path having a corresponding time value that is chronologically last of all time values uniquely associated with the plurality of spatial values used to define the first path, a start spatial value of the second path having a corresponding time value that is chronologically first of all time values uniquely associated with the plurality of spatial values used to define the second path.

7. The computer-readable medium of claim 1, wherein the computer program representing instructions to cause the computer to determine if the person associated with the first path and the person associated with the second path are the same person includes instructions to determine at least whether a time value corresponding to an end spatial value of the first path is within a predetermined time of a time value corresponding to a start spatial value of the second path, the end spatial value of the first path having a corresponding time value that is chronologically last of all time values uniquely associated with the plurality of spatial values used to define the first path, the start spatial value of the second path having a corresponding time value that is chronologically first of all time values uniquely associated with the plurality of spatial values used to define the second path.

8. A computer-readable medium encoded with a computer program representing instructions to cause a computer to:

receive information associated with a plurality of paths, each path from the plurality of paths representing movement of an object defined over time;

iteratively determine, for each path from the plurality of paths, whether that path can be linked to another path from the plurality of paths at least partially based on a predetermined linking rule;

produce a first link between a first path from the plurality of paths and a second path from the plurality of paths based on the iteratively determining;

produce a second link between a third path from the plurality of paths and a fourth path from the plurality of paths; and remove the first link between the first path and the second path and remove the second link between the third path and the fourth path when information associated with the first link and information associated with the second link satisfy a path-breaking rule, the path-breaking rule includes a time-space bubble condition, the information associated with the first link includes a spatial coordinate and corresponding time value associated with the first link, the information associated with the second link includes a spatial coordinate and corresponding time value associated with the second link, the path-breaking rule is satisfied when the spatial coordinate and corresponding time value associated with the first link and the spatial coordinate and corresponding time value associated with the second link satisfy the time-space bubble condition.

9. The computer-readable medium of claim 8, wherein the computer program representing instructions to cause the computer to resolve is configured to remove a path from a set of linked paths.

10. The computer-readable medium of claim 8, wherein each path from the plurality of paths includes a plurality of data elements, each data element from the plurality of data elements associated with a path from the plurality of paths including a spatial value and a time value, the computer program representing instructions to cause the computer to iteratively determine being configured to extract and store at least one data element associated with each path from the plurality of paths, the at least one data element including at least one of a start spatial value, an end spatial value, a length between a start spatial value and an end spatial value.

11. The computer-readable medium of claim 10, wherein the computer program further representing instructions to cause a computer to:
   sort each path from the plurality of paths based on start time values associated with the plurality of paths;
   sort each path from the plurality of paths based on end time values associated with the plurality of paths; and
   iteratively compare each path from the plurality of paths sorted based on start time values with each path from the plurality of paths sorted based on end time values.

12. The computer-readable medium of claim 8, wherein each path from the plurality of paths includes a plurality of data elements, each data element from the plurality of data elements associated with a path from the plurality of paths including a spatial value and a time value, the computer program representing instructions to cause the computer to resolve conflicts being configured to determine if at least one of
   a distance between an end spatial value of a first path from the plurality of paths and a start spatial value of a second path from the plurality of paths is within a predetermined distance threshold or
   a time between an end time value of the first path from the plurality of paths and a start time value of the second path from the plurality of paths is within a predetermined time threshold.

13. An apparatus, comprising:
   a first image capture device configured to capture a plurality of images associated with a first physical area over a time period;
   a second image capture device configured to capture a plurality of images associated with a second physical area over the time period, the second physical area being substantially different from the first physical area;
   a processor in communication with the first image capture device and the second image capture device, the processor being configured to extract a plurality of sets of spatial values and corresponding time values associated with the first physical area from the images associated with the first physical area, the processor being configured to extract a plurality of sets of spatial values and corresponding time values associated with the second physical area from the images associated with the second physical area,
   each set from the plurality of sets of spatial values and corresponding time values associated with the first physical area being used to define a path of an object within the first physical area, each set from the plurality of sets of spatial values and corresponding time values associated with the second physical area being used to define a path of an object within the second physical area,
   the processor being configured to associate the path of the object within the first physical area and the path of the object within the second physical area if the processor determines that the plurality of sets of spatial values and corresponding time values associated with the object within the first physical area and the plurality of sets of spatial values and corresponding time values associated with the object within the second physical area satisfy a time-space bubble criteria,
   the processor being configured to prevent merging of the path of the object within the first physical area and the path of the object within the second physical area into a combined path of the object if the processor determines that the combined path will intersect an exclusion region.

14. The computer-readable medium of claim 1, wherein the computer program representing instructions to cause the computer to:
   produce a link between the first path and the second path when the person associated with the first path and the person associated with the second path are the same person; and
   resolve a conflict associated with the link based on a predetermined conflict-resolution rule.

15. A computer-readable medium encoded with a computer program representing instructions to cause a computer to:
   analyze information used to define a first path, the information used to define the first path including a first plurality of data elements, each data element from the first plurality of data elements associated with the first path including a spatial value and a time value, each spatial value associated with the first path indicating a position of a person associated with the first path at a time associated with the corresponding time value;
   analyze information used to define a second path, the information used to define the second path including a second plurality of data elements, each data element from the second plurality of data elements associated with the second path including a spatial value and a time value, each spatial value associated with the second path indicating a position of a person associated with the second path at a time associated with the corresponding time value, the spatial values used to define the second path including spatial values not included in the information used to define the first path;
   determine, at least partially based on the analysis of the information used to define the first path and the analysis of the information used to define the second path, if the person associated with the first path and the person associated with the second path are the same person; and
   prevent merging of the first path and the second path into a third path when the third path intersects an exclusion region.

16. The computer-readable medium of claim 1, wherein the computer program representing instructions to cause the computer to:
   produce a link between the first path and the second path when the person associated with the first path and the person associated with the second path are the same person; and
   remove the link based on a predetermined conflict-resolution rule.

17. The computer-readable medium of claim 8, wherein the predetermined conflict-resolution rule includes a path-breaking rule, the link being removed when the path-breaking rule is satisfied.

18. The apparatus of claim 13, wherein the processor is configured to resolve a conflict associated with the link.

* * * * *